United States Patent
Lund et al.

(10) Patent No.: US 11,511,767 B2
(45) Date of Patent: Nov. 29, 2022

(54) TECHNIQUES FOR UTILIZING CV2X REGISTRATION DATA

(71) Applicant: QUALCOMM Incorporated, San Diego, CA (US)

(72) Inventors: Benjamin Lund, Escondido, CA (US); Garrett Shriver, Santee, CA (US); Edwin Chongwoo Park, San Diego, CA (US); Soumya Das, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 16/936,425

(22) Filed: Jul. 23, 2020

(65) Prior Publication Data

US 2022/0024476 A1    Jan. 27, 2022

(51) Int. Cl.
*H04N 5/44*    (2011.01)
*B60W 50/14*    (2020.01)
*H04W 4/40*    (2018.01)

(52) U.S. Cl.
CPC .............. *B60W 50/14* (2013.01); *H04W 4/40* (2018.02); *B60W 2050/146* (2013.01)

(58) Field of Classification Search
CPC ........... B60W 50/14; B60W 2050/146; B60W 2540/043; B60W 2556/45; H04W 4/40; H04W 88/04; B60K 2370/566; H04L 67/564

See application file for complete search history.

(56) References Cited

U.S. PATENT DOCUMENTS

| | | | |
|---|---|---|---|
| 9,397,838 B1 | 7/2016 | Chen | |
| 9,397,980 B1 | 7/2016 | Chen | |
| 9,544,001 B1* | 1/2017 | Aldereguia | H04W 4/90 |
| 10,163,276 B2 | 12/2018 | Kim et al. | |
| 10,168,683 B2 | 1/2019 | Brew et al. | |
| 10,257,340 B2 | 4/2019 | Adderly et al. | |
| 10,325,596 B1 | 6/2019 | Tran et al. | |
| 10,423,292 B2 | 9/2019 | Chan et al. | |
| 10,449,967 B1* | 10/2019 | Ferguson | G08G 1/0129 |
| 10,462,225 B2 | 10/2019 | Chen et al. | |

(Continued)

FOREIGN PATENT DOCUMENTS

CN    109495498    3/2019

OTHER PUBLICATIONS

U.S. Appl. No. 16/936,423, filed Jul. 23, 2020, Lund et al.
U.S. Appl. No. 16/936,428, filed Jul. 23, 2020, Lund et al.

*Primary Examiner* — Munear T Akki
(74) *Attorney, Agent, or Firm* — Campbell Chiang; Weaver Austin Villeneuve & Sampson LLP

(57) ABSTRACT

Techniques described herein include utilizing a mobile device as a proxy receiver for a vehicle in a V2X environment. In some embodiments, the mobile device may be configured to obtain vehicle and/or occupant metadata and store such data in memory at the mobile device. At a subsequent time, the mobile device may receive a V2X data message from a remote device (e.g., a V2X capable vehicle, another proxy device, a roadside unit, or any suitable device of the V2X environment that is different from the mobile device). The mobile device may process the data message based at least in part on the vehicle metadata and/or occupant metadata and perform one or more operations in response to processing the data message.

30 Claims, 9 Drawing Sheets

(56) References Cited

U.S. PATENT DOCUMENTS

| | | |
|---|---|---|
| 10,469,429 B2 | 11/2019 | Hardee et al. |
| 10,530,719 B2 | 1/2020 | Anders et al. |
| 10,558,794 B2 | 2/2020 | Myers et al. |
| 10,679,446 B2 | 6/2020 | Santhosh et al. |
| 10,743,176 B1 | 8/2020 | Khan et al. |
| 10,750,005 B2 | 8/2020 | Keen et al. |
| 10,850,746 B2 | 12/2020 | Marti et al. |
| 10,893,010 B1 | 1/2021 | Argenti et al. |
| 11,165,591 B2 | 11/2021 | Thakore |
| 11,348,387 B2 | 5/2022 | Peng et al. |
| 11,410,551 B2 | 8/2022 | Lund |
| 2005/0197775 A1 | 9/2005 | Smith |
| 2009/0222902 A1 | 9/2009 | Bender et al. |
| 2010/0031025 A1 | 2/2010 | Zhang et al. |
| 2011/0098911 A1 | 4/2011 | Ellanti |
| 2011/0141989 A1 | 6/2011 | Kondo |
| 2013/0166907 A1 | 6/2013 | Brown et al. |
| 2015/0046022 A1* | 2/2015 | Bai ................. G07C 5/008 701/461 |
| 2015/0134428 A1 | 5/2015 | Li et al. |
| 2015/0244707 A1 | 8/2015 | Bowen |
| 2015/0266377 A1 | 9/2015 | Hampiholi et al. |
| 2015/0282083 A1 | 10/2015 | Jeong et al. |
| 2016/0080944 A1 | 3/2016 | Colegate et al. |
| 2016/0088052 A1 | 3/2016 | Juzswik et al. |
| 2016/0119151 A1 | 4/2016 | Park et al. |
| 2017/0032402 A1 | 2/2017 | Patsiokas et al. |
| 2017/0270509 A1 | 9/2017 | Colegate et al. |
| 2017/0279784 A1 | 9/2017 | Kent |
| 2018/0049274 A1 | 2/2018 | Kim et al. |
| 2018/0059669 A1 | 3/2018 | Madigan et al. |
| 2018/0213376 A1 | 7/2018 | Pinheiro et al. |
| 2018/0295518 A1 | 10/2018 | Alloche et al. |
| 2019/0096243 A1* | 3/2019 | Doig ................. G08G 1/091 |
| 2019/0132932 A1 | 5/2019 | Klecha et al. |
| 2019/0200228 A1 | 6/2019 | Adrangi et al. |
| 2019/0245703 A1 | 8/2019 | Simplicio Junior, Jr. et al. |
| 2019/0279440 A1 | 9/2019 | Ricci |
| 2020/0177398 A1 | 6/2020 | Takemori et al. |
| 2020/0267739 A1 | 8/2020 | Nguyen et al. |
| 2020/0358764 A1 | 11/2020 | Hojilla Uy et al. |
| 2020/0365029 A1 | 11/2020 | Kourous-Harrigan et al. |
| 2020/0389455 A1 | 12/2020 | Fang et al. |
| 2021/0014655 A1 | 1/2021 | Stahlin |
| 2021/0112386 A1 | 4/2021 | Lee |
| 2021/0142672 A1* | 5/2021 | Tsai ................. H04W 4/46 |
| 2021/0168609 A1 | 6/2021 | Nishimura |

* cited by examiner

TECHNIQUES FOR UTILIZING CV2X REGISTRATION DATA

BACKGROUND

Vehicle-to-everything (V2X) is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly-termed road side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies in a direct-communication mode as defined by the 3rd Generation Partnership Project (3GPP). A component or device on a vehicle, RSU, or other V2X entity that is used to communicate V2X messages is generically referred to as a V2X device or V2X user equipment (UE).

Autonomous and semi-autonomous vehicles, including vehicles with Advanced Driver-Assistance Systems (ADAS), can communicate and coordinate maneuvers using V2X. To help V2X-capable vehicles ("V2X vehicles") maneuver safely on the road, V2X vehicles can communicate intended maneuvers to other V2X vehicles. This can include maneuvers such as a lane change, intersection crossing, and the like, along with the corresponding time window for the behavior trajectory.

Legacy vehicles, which may or may not include vehicles with sensors and/or ADAS capabilities, may lack V2X capabilities and, thus, which are not configured with ADAS, may not take advantage of the valuable data being communicated, or their involvement may be suboptimal and/or limited. Many benefits of a vehicle-to-everything (V2X) environment depend on knowing the accurate inter-vehicle distances and relative locations as well as on having environmental and situational awareness. However, Legacy vehicles are incapable of utilizing or transmitting such information or may be limited in their transmission capabilities. Both legacy vehicle drivers and autonomous (or semi-autonomous) vehicle drivers can benefit from these types of shared interactions and communications.

BRIEF SUMMARY

Techniques described herein provide for registering and utilizing vehicle metadata (e.g., physical attributes and/or capabilities of a vehicle) and/or occupant metadata (e.g., attributes associated with the driver and/or one or more passengers) by a mobile device to perform operations on behalf of a vehicle. This metadata may be used by a mobile device to perform operations in conjunction with, or in lieu of ADAS features of the vehicle.

Some embodiments may include a method for utilizing vehicle metadata by a mobile device to perform operations on behalf of a vehicle. The method may comprise obtaining, by the mobile device, vehicle metadata associated with the vehicle, the vehicle metadata describing one or more attributes of the vehicle. The method may further comprise receiving, via one or more transceivers of the mobile device, a data message from a remote device (e.g., a V2X vehicle, another mobile device transmitting on behalf of a legacy vehicle, a roadside unit, etc.). The method may further comprise determining, by the mobile device, whether to process the data message based at least in part on the vehicle metadata. The method may further comprise, in response to a determination to process the data message, performing, by the mobile device, one or more operations based on the data message.

Some embodiments may include a mobile device. The mobile device may comprise a memory and one or more processors communicatively coupled with the memory. In some embodiments, the one or more processors are configured to execute the instructions to cause the mobile device to perform operations. The operations may comprise obtaining, by the mobile device, vehicle metadata associated with the vehicle, the vehicle metadata describing one or more attributes of the vehicle. The operations may further comprise receiving, via one or more transceivers of the mobile device, a data message from a remote device (e.g., a V2X vehicle, another mobile device transmitting on behalf of a legacy vehicle, a roadside unit, etc.). The operations may further comprise determining, by the mobile device, whether to process the data message based at least in part on the vehicle metadata. The operations may further comprise, in response to a determination to process the data message, performing, by the mobile device, one or more operations based on the data message.

Some embodiments may comprise a non-transitory computer-readable medium. The non-transitory computer-readable medium may comprise stored instructions for utilizing vehicle metadata to perform one or more operations on behalf of a vehicle. In some embodiments, the instructions, when executed by one or more processors of a mobile device, cause the one or more processors to perform operations. The operations may comprise obtaining, by the mobile device, vehicle metadata associated with the vehicle, the vehicle metadata describing one or more attributes of the vehicle. The operations may further comprise receiving, via one or more transceivers of the mobile device, a data message from a remote device (e.g., a V2X vehicle, another mobile device transmitting on behalf of a legacy vehicle, a roadside unit, etc.). The operations may further comprise determining, by the mobile device, whether to process the data message based at least in part on the stored vehicle metadata. The operations may further comprise, in response to a determination to process the data message, performing, by the mobile device, one or more operations based on the data message.

Some embodiments may comprise a mobile device that comprises means for obtaining vehicle metadata associated with the vehicle, the vehicle metadata describing one or more attributes of the vehicle. The mobile device may further comprise means for receiving, by the mobile device, a data message from a remote device. The mobile device may further comprise means for determining, by the mobile device, whether to process the data message based at least in part on the vehicle metadata. The mobile device may further comprise means for performing, by the mobile device, one or more operations in response to a determination to process the data message.

Figure 1:
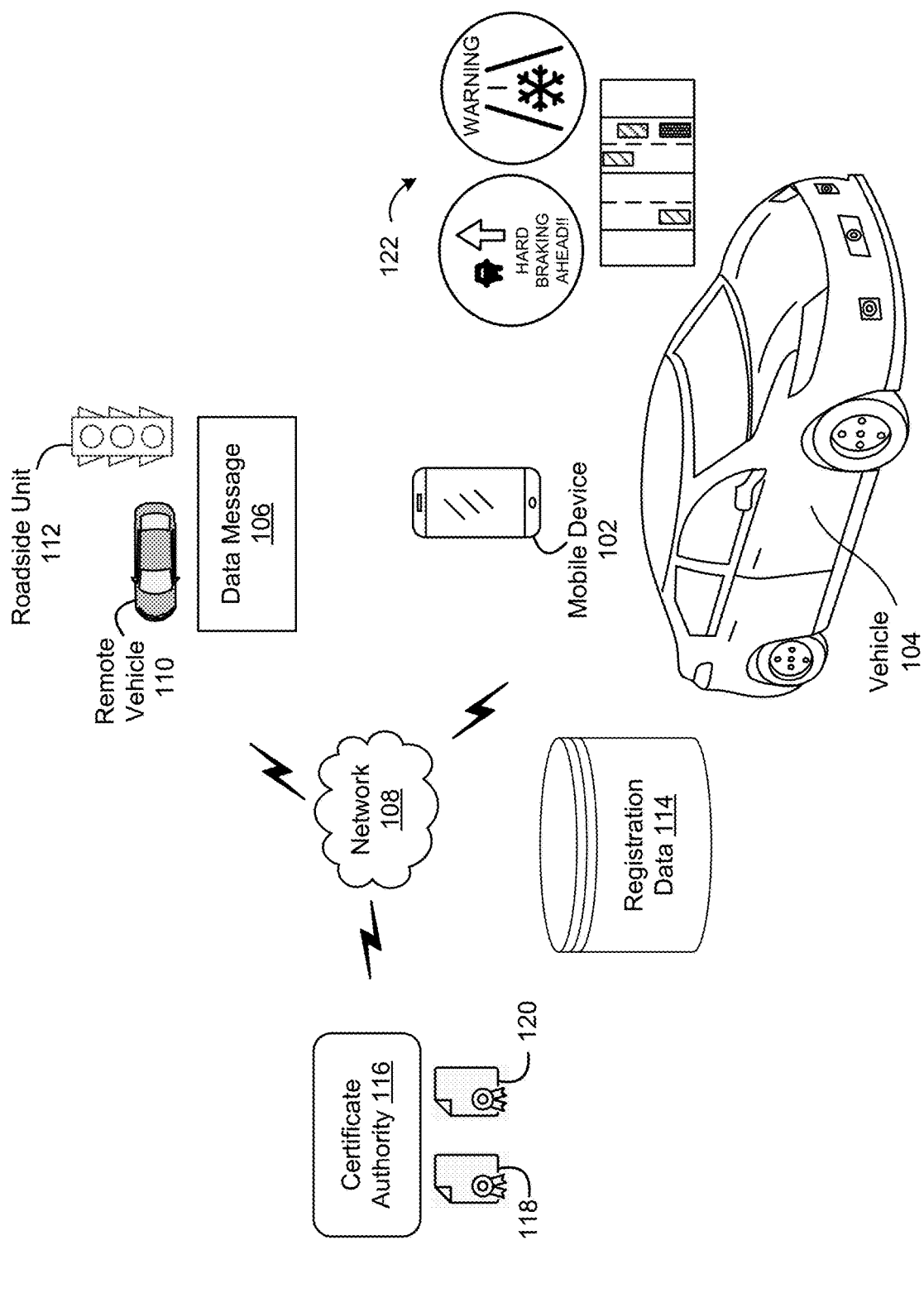
FIG. 1 is a simplified block diagram illustrating an example V2X environment, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

V2X-capable vehicles may execute vehicle-to-vehicle (V2V) safety applications built around Society of Automotive Engineers (SAE) J2735 BSMs, which communicate information about vehicle position, time, heading, speed, acceleration, predicted path, path history, and more. Other V2X messages may include, but are not limited to: cooperative awareness messages (e.g., used to announce position, movement, and basic attributes of a transmitting device), decentralized environmental notification messages (e.g., utilized to report detection of a traffic event or road hazard), signal phase and timing messages (e.g., information for one or more traffic lights), in vehicle information messages (e.g., used for providing static or dynamic road signage information for in-vehicle presentation), map messages (e.g., used for road topography and geometry information), and the like. V2X message may be utilized to support safety applications such as Forward Collision Warnings (FCW), Do-Not-Pass Warnings (DNPW), and the like.

In some embodiments, V2X capable vehicles may be configured to transmit vehicle metadata (also referred to as "vehicle data"). As used herein, "vehicle metadata" may describe one or more attributes, characteristics, classifications, capabilities, and/or profiles associated with a vehicle. By way of example, vehicle metadata may include one or more images of the vehicle, one or more identifiers associated with the vehicle (e.g., license plate, vehicle identification number (VIN), make, model, year of manufacture, type of vehicle (e.g., SUV, car, truck, sedan, etc.), and the like), one or more capabilities of the vehicle (e.g., any suitable ADAS capability, breaking distance, sensor(s) of the vehicle as manufactured, aftermarket sensor(s) added to the vehicle, etc.), one or more physical attributes of the vehicle (e.g., color(s), dent(s) and dent location(s) (e.g., in left rear fender), rust/rust locations, cracked rear windshield, four-door, hatchback, sunroof(s) presence and state (e.g., open, closed), moon roof(s) presence and state (e.g., open, closed), roof rack/roof rack placement, bike rack/bike rack placement, trailer hitch presence, pulling a trailer (and in some embodiments, aspects of the trailer), etc.), or any suitable combination thereof. Vehicle metadata may be provided by a user via a user interface of the vehicle and/or via a mobile device separate from the vehicle but in communication with the V2X capable vehicle. In some embodiments, a V2X capable vehicle may further be configured to transmit occupant metadata (also referred to herein as "occupant data"). As used herein, "occupant metadata" includes any suitable number and/or combination of attributes such as an identifier for the occupant (e.g., an alphanumeric identifier, a first name, a middle name, a last name, a prefix, a suffix, etc.), one or more driving credentials associated with the occupant (e.g., driver's license, commercial driver's license, driving certification, driving permit, etc.), one or more physical attributes of the occupant (e.g., height, hair length, eye color, etc.), driving experience data associated with the occupant (e.g., years of experience, number of accidents, number of at-fault accidents, etc.), user preference information (e.g., indicating one or more user preferences for generating and/or presenting driver assistance information), one or more occupant attributes (e.g., occupant attributes not covered by any of the attributes above such as indications that the occupant is prone to motion sickness, often sleeps while traveling, is a nervous passenger, etc.), and the like, or any suitable combination of the above. In some embodiments, occupant metadata may be provided via a user interface of the vehicle and/or via a mobile device separate from the vehicle but in communication with the V2X capable vehicle. Various techniques for obtaining vehicle metadata and/or occupant metadata are discussed more thoroughly below.

Not all vehicles are V2X capable or may have differing levels of V2X capabilities. A vehicle that lacks the capability to transmit V2X messages (and/or may not participate at a highest level of participation in a V2X environment) is referred to herein as a legacy vehicle (LV). In some embodiments, a legacy vehicle may be one that lacks the ability to fully participate in V2X communications. For example, a legacy vehicle might be capable of transmitting certain V2X messages but lacks the ability to transmit and/or receive and/or process at least one other V2X message. The techniques provided herein are directed to the utilization of a mobile device as a proxy (e.g., a mobile device that receives and/or transmits and/or processes data on behalf of the legacy vehicle). The mobile device (e.g., a smartphone, smartwatch, laptop, tablet, etc.) may be separate from the vehicle. In some embodiments, the mobile device is a device that is different from any of the devices of the legacy vehicle as manufactured. The mobile device may process V2X messages on behalf of the LV. In some embodiments, the mobile device may be utilized to obtain any suitable combination of vehicle metadata and/or occupant metadata. While receiving V2X messages as the LV's proxy, the mobile device may be configured to determine whether the received V2X messages are relevant to the vehicle. In some embodiments, relevancy may be based at least in part on vehicle metadata and/or occupant metadata stored at the mobile device.

In some embodiments, one or more V2X messages can include vehicle attributes (e.g., color, make, model, one or more images, license plate identifier, ADAS capabilities, vehicle position, speed, heading, acceleration, location, lane number, and/or the like) of each of the vehicles sensed by a given Remote Vehicle (RV). Some of these attributes may be transmitted by V2X message, received by the given RV (or other V2X capable device), and retransmitted to other devices (e.g., other vehicles and/or proxy devices). Recipients of such data may include devices that are now aware of another vehicle even though the device lacks direct line of sight with that vehicle, has not collected any sensor data corresponding to that vehicle, and/or may be out of reception range to receive the message from its original source (e.g., the vehicle itself). Each V2X capable device (e.g., an RV, a proxy device, etc.) can transmit any suitable combination of its own attributes (in the case of the proxy device, its own attributes refer to the attributes of the vehicle for which it operates as proxy) via one or more V2X messages. This collective data can be used to inform nearby vehicles' movement and maneuver execution.

The V2X capable vehicles and the mobile device operating as proxy (referred to herein as a Proxy Device (PD)) for an LV may receive V2X messages from remote devices (e.g., nearby V2X-capable vehicles within communication range, referred to herein as Remote Vehicles (RVs), roadside units, other proxy devices, etc.). For example, nearby RVs may broadcast BSM messages up to 10 times per second (10 Hz). Thus, if a PD is surrounded by 200 RVs (within a threshold distance of the LV) each communicating up to 10 BSMs per second, the PD may need to process up to 2000 BSM messages per second. This processing can include verifying digitally-signed certificates of the messages and determining, based on the content of the messages, whether to provide driver assistance information (e.g., alerts, alarms, graphical and/or audible data, etc.) to a driver, alter or execute a maneuver, store received data elements, etc. Moreover, additional message types (e.g., non-BSM safety messages) may also be communicated to the PD from nearby RVs, and other communications may be received from other remote devices such as roadside (RSUs), traffic-related servers, and more. Further, the information communicated by BSMs and other messages is often very time sensitive and must be processed quickly by the PD before it becomes irrelevant. Thus, the PD often has a limited ability to delay the processing of these incoming messages. This can cause a high processing load on the hardware block (e.g., Central Processing Unit (CPU), Digital Signal Processor (DSP), and/or Elliptic Curve Digital Signature Algorithm (ECDSA)) of the PD. Generating and/or providing driver assistance information (e.g., alerts, alarms, graphical presentations, audible presentations, maps, models, etc.) from the V2X messages utilizes processing resources of the mobile device (and potentially the processing resources of the LV if output devices of the LV are utilized for presentation of the driver assistance information). Storing data elements from received messages (e.g., additional vehicle metadata provided by a remote device) may utilize memory resources of the mobile device. It is important that the mobile device be configured to identify when it is appropriate to process the received data messages, provide driver assistance information, store vehicle metadata, or the like, else the processing and/or memory resources of the mobile device may be unnecessarily wasted.

Embodiments provided herein can address these and other issues by enabling a PD to filter incoming broadcasted messages from RVs. Traditionally, broadcasted messages are received by any V2X capable vehicle within a given range of the broadcast source. This could cause some PDs and V2X capable vehicles to unnecessarily process messages that have little to no relevance to an LV being proxied by a PD and/or the V2X vehicle. The techniques provided herein enable LVs to participate in the V2X network, allow for driver assistance information to be provided to the drivers of such vehicles, enable the mobile device to transmit vehicle metadata to remove devices, enable a number of various filtering techniques such that a processing burden and memory usage of the PD is minimized (e.g., reduced to processing only what is relevant to the proxied vehicle to which the PD corresponds, while irrelevant data is discarded). Additional details are provided herein below, with respect to the appended figures.

FIG. 1 is a simplified block diagram illustrating an example environment 100 (e.g., a V2X environment), according to an embodiment. By way of example, FIG. 1 depicts mobile device 102 being utilized as a proxy for vehicle 104. In some embodiments, vehicle 104 lacks communication capabilities and/or components for the environment 100. That is, vehicle 104 cannot transmit and/or receive V2X data messages (e.g., data message 106, a V2X message) via network 108 (e.g., a cellular network, a WiFi network, any suitable network configured for V2X communications, etc.). Thus, vehicle 104, in some embodiments, is a legacy vehicle. Data message 106 may be transmitted by any suitable remote device (e.g., RV 110, roadside unit 112, or any suitable device different from mobile device 102, the device being utilized to transmit and receive V2X messages for vehicle 104). It should be appreciated that mobile device 102 may be temporally located within vehicle 104 and may be utilized as a proxy device for transmitting and/or receiving V2X messages on behalf of vehicle 104. In other embodiments, vehicle 104 may be a V2X capable vehicle that is configured to transmit and receive V2X messages via network 108. In either scenario, mobile device 102 and vehicle 104 may be communicatively coupled (e.g., via network 108, via a Bluetooth pairing, etc.) such that data may be exchanged between the mobile device and the vehicle.

It should be appreciated that although FIG. 1 depicts a single mobile device operating as a proxy, any suitable number of mobile devices may act as proxy for a single vehicle. In some embodiments, sensors of the mobile devices may be collectively utilized for obtaining sensor data (e.g., location, motion detection, images of vehicle(s)/occupant(s)/components of the vehicle, etc.). In some embodiments, multiple mobile devices may be utilized to collect similar sensor data (e.g., multiple instances of location data indicating a location of the mobile device and/or vehicle). In some embodiments, the mobile devices may be configured to communicate with one another and/or the vehicle via any suitable communications network (e.g., WiFi, Bluetooth, cellular, cellular/WAN, and WAN).) in order to ascertain which particular mobile device has a most sensitive/accurate sensor. In some embodiments, this particular mobile device may be selected by the group to provide the particular sensor data. In some embodiments, sensor data from the group of mobile devices may be averaged or otherwise combined. In still further examples, any of the mobile devices may be configured to receive V2X messages and may forward data elements and/or the data message to the vehicle and/or other mobile devices. Thus, in some embodiments, one mobile device may perform any suitable subset of operations discussed herein with respect to the mobile device, while another mobile device may perform a different subset of operations. Any suitable number of mobile devices may thus be utilized to perform the set of operations discussed herein with respect to a single mobile device. Accordingly, any example provided herein may be similarly applied to embodiments in which multiple mobile devices are utilized as a proxy device.

In some embodiments, the mobile device 102 and/or the vehicle 104 may be utilized to obtain registration data 114. Registration data 114 may, in some embodiments, include any suitable combination of vehicle metadata describing attributes of the vehicle 104 and/or occupant metadata describing one or more occupants (e.g., the driver, one or more passengers) of vehicle 104. Techniques for obtaining vehicle metadata and/or occupant metadata are discussed in more detail with respect to FIG. 2. Registration data 114 may be stored in any suitable combination of the memory of the vehicle 104 and/or the memory of the mobile device 102.

In some embodiments, the environment 100 may include a certificate authority 116. The certificate authority 116 may be any suitable entity (e.g., a state or federal government agency, a network provider of the network 108, or the like). In some embodiments, the vehicle 104 (if V2X capable) and/or the mobile device 102 (when operating as a proxy for vehicle 104) may request and/or receive a certificate (e.g., certificate 118) from certificate authority 116. In some embodiments, the certificate may be stored in memory of the vehicle 104 and/or the mobile device 102 during manufacturer or at any suitable time. In some embodiments, the certificate 118 may include a credential associated with the certificate authority 116 (e.g., a public key of a public/private key pair associated with the certificate authority, etc.). In some embodiments, each transmitting device of network 108 may be required to provide a respective credential (e.g., credential 120) with each data message transmitted via the network 108. In some embodiments, some portion of the data of each data message may be encrypted and/or digitally signed (e.g., using a private key of the transmitting device). By way of example, the credential 120 may include a digital certificate issued by the certificate authority 116, the digital certificate comprising a public key of the transmitting device as signed by the private key of the certificate authority. In some embodiments, a receiving device (e.g., mobile device 102, vehicle 104) may utilize the public key of certificate authority 116 (e.g., obtained from certificate 118) to decrypt some portion of the data message that was encrypted with the private key of the transmitting device and/or to verify the digital signature, the digital signature being generated using the private key of the transmitting device and provided in the data message.

Although only one mobile device, vehicle, remote vehicle, and roadside unit are depicted in FIG. 1, it should be appreciated that any suitable number of such devices may be utilized. In some embodiments, RV 110 may transmit data message 106. Data message 106 may be broadcasted and/or may be directed to vehicle 104 (e.g., via a network identifier by which vehicle 104 is known within network 108, through the inclusion of one or more vehicle attributes of vehicle 104 different from the network identifier, or the like). The vehicle 104 or the mobile device 102 operating as proxy for the vehicle 104 (the set referred to as "the receiving device) may be configured to receive the data message 106. The receiving device may compare the vehicle attributes received via one or more data elements (e.g., data fields) of the data message 106) to the vehicle metadata stored at the receiving device.

In some embodiments, the receiving device may be configured to process the data message when the network identifier of the message matches the network identifier stored in registration data 114 and/or when a threshold number of data elements of the received message match vehicle attributes as stored as registration data 114. In some embodiments, the receiving device may discard (or process less data elements of the data message) if the network identifier of the data message 106 does not match the network identifier stored in registration data 114 and/or if the number vehicle attributes of the data messages 106 fail to match a threshold number of vehicle attributes as stored in registration data 114.

In some embodiments, the vehicle 104 and/or the mobile device 102 operating as proxy for the vehicle 104 may process or discard a received data message (e.g., data message 106) based at least in part on the occupant metadata of registration data 114. By way of example, particular types of messages may be processed (or discarded) when the driver is a relatively inexperienced driver (e.g., occupant data indicating the occupant is the current driver and has less than a year of driving experience) while these message may be discarded (or processed) when the driver is known to be an experienced driver (e.g., a driver that has more than a year of experience). In some embodiments, the receiving device may be configured to process (or discard) certain types of data messages (e.g., data message 106) when the driver of the vehicle 104 is associated with occupant data indicating the driver has been in more than a threshold number of accidents (e.g., more than 0, more than 1, etc.) and/or more than a threshold number of accidents of a particular accident type (e.g., accidents in which the driver rear-ended another vehicle, accidents in which the driver side-swiped another vehicle, etc.). The receiving device may be configured to discard the data message if those conditions are not met as indicated by the occupant metadata. As another example, the proxy device can be configured to discard messages intended for vehicles, drivers, and/or passengers matching a particular set of metadata that does not match the metadata associated with the vehicle, its driver, or a passenger of the vehicle.

The mobile device 102 operating as proxy for vehicle 104 (or the vehicle 104 itself) may be configured to execute any suitable operations based at least in part on processing the data message 106. By way of example, the receiving device (e.g., the mobile device operating as proxy for vehicle 104 or vehicle 104 if vehicle 104 is V2X capable) may be configured to generate driver assistance information 122. Driver assistance information 122 may include any suitable combination of graphical presentations and/or audible presentations that inform the driver of any suitable condition (e.g., weather conditions, road conditions, other driver's actions such as hard breaking, a real-time model that depicts at least locations of all V2X devices and sensed vehicles in the environment 100 within a threshold distance of the vehicle 104 or mobile device 102 if its acting as proxy for the vehicle 104). The driver assistance information 122 may be presented via one or more output devices (e.g., a display and/or speaker) of the mobile device 102 and/or one or more output devices of the vehicle 104.

In some embodiments, additional vehicle metadata may be provided via the data message 106. By way of example, the mobile device 102, operating as a proxy for vehicle 104, may not currently store the color (or any suitable physical attribute) of the vehicle 104. However, RV 110 may utilize one or more of its sensors (e.g., a camera) to identify the vehicle 104 is white. The RV 110 may transmit this vehicle attribute (and/or any suitable number of vehicle attributes as identified by sensor data collected by its sensors) in data message 106. Upon receipt, the receiving device may be configured to store this additional vehicle metadata (e.g., as part of the vehicle metadata of registration data 114, separate from the vehicle metadata of registration data 114). The receiving device may be configured to store this additional vehicle metadata when it may be determined that the received vehicle metadata is relevant to the receiving device (e.g., either describes aspects of the receiving device or the vehicle for which the receiving device operates as proxy). Determining such relevance is discussed in further detail below. In some embodiments, if the receiving device can identify that it is the only device within a threshold distance of RV 110, it may determine that any vehicle attributes provided in the message are relevant and may immediately store the received vehicle attributes with the vehicle metadata in local memory.

In some embodiments, the receiving device may be configured to temporarily store vehicle metadata received from a remote device until it receives the same data over a threshold number of times from a threshold number of sources (e.g., a threshold number of remote devices). In some embodiments, data that is stored temporarily may be stored separate from more reliable data (e.g., user-provided data, previously verified data, etc.). By way of example, the temporarily stored data may be stored in a separate object, log, or data container different from the data container used to store currently known registration metadata (including vehicle metadata) of the vehicle. In some embodiments, the receiving device may be configured to store the additional vehicle metadata (e.g., the color white) with the registration data 114 only after the same attribute has been received by at least a threshold number of different sources (e.g., three different V2X vehicles, two V2X vehicles and a roadside unit, one V2X vehicle and two proxy devices, four different sources, etc.). Thus, the receiving device may be configured to obtain vehicle metadata from other devices of the environment 100. In some embodiments, user-provided vehicle metadata may be preferred over vehicle metadata provided by any other source. That is, in some embodiments, user-provided data may not be overwritten with vehicle metadata received from a remote device. In some embodiments, the user-provided data may persist until the same vehicle metadata values have been received from multiple different sources and determined to correspond to the receiving device (or its associated vehicle).

It should be appreciated that mobile device 102 need not transmit V2X messages on behalf of vehicle 104. In other embodiments, mobile device 102 may transmit a V2X message that indicates mobile device 102 is acting as proxy for vehicle 104. In some embodiments, other transmitting devices (e.g., RV 110 and/or roadside unit 112, other proxy devices) may utilize this knowledge when transmitting messages and/or displaying information about vehicle 104 (e.g., via real-time models presented at those vehicles/proxy devices). One example may include displaying an indication that vehicle 104 is a legacy vehicle in a real-time traffic model based at least in part on receiving a message from the mobile device 102 indicating it is operating as a proxy on behalf of vehicle 104. In some embodiments, the transmitting devices may be configured with a rule set that may cause the transmitting device to modify one or more data elements (or transmit different data elements) in a message if it is known that the recipient device is a proxy device (rather than a V2X capable vehicle).

In some embodiments, the transmitting device (e.g., mobile device 102 operating as a proxy device and/or the vehicle 104) may transmit via network 108 any suitable combination of the registration data. By way of example, the transmitting device may transmit any suitable combination of the vehicles' ADAS capabilities to other devices of the environment 100 via network 108. As a non-limiting example, the transmitting device may transmit data indicating what sensors are being utilized (e.g., by the mobile device 102 and/or the vehicle 104) to collect sensor data that is also being transmitted in the message. Thus, a receiving device (e.g., RV 110) may be able to ascertain a degree of accuracy and/or trust of the sensor data provided (e.g., based at least in part on the particular sensor(s) being used for collection). Thus, if the RV 110 (or any suitable receiving device) receives sensor data from two sources regarding a common entity (e.g., vehicle 104), the receiving device may be configured to prefer the sensor data provided by the source having the more accurate sensor. In some embodiments, each device of environment 100 may be configured with a rule set that identifies the accuracy of a predefined number of sensors. In other embodiments, a degree of accuracy can also be provided in the transmitted data message and utilized by the receiver to assess whether to utilize the sensor data being provided.

Figure 2:
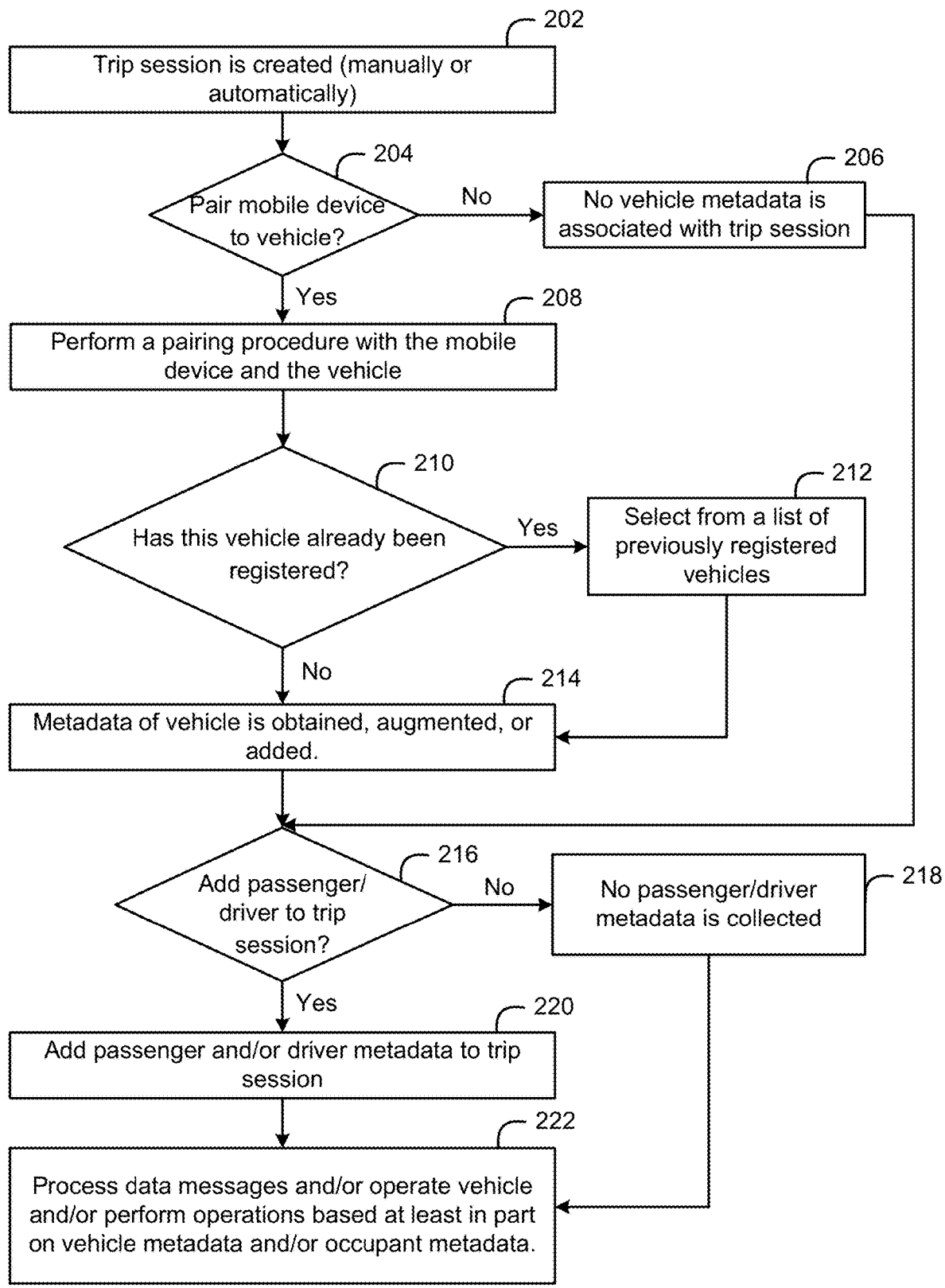
FIG. 2 is a flowchart depicting a method for obtaining registration information (e.g., vehicle metadata and/or occupant metadata), according to an embodiment.

FIG. 2 is a flowchart depicting a method 200 for obtaining registration information, according to an embodiment. The method 200 may be performed by a registration device (e.g., the mobile device 102 of FIG. 1 which is an example of proxy device 900 of FIG. 9, the vehicle 104 which can be an example of a legacy vehicle or a V2X capable vehicle).

The method 200 may begin at block 202 where a trip session may be created. In some embodiments, the trip session may be created manually or automatically. By way of example, a trip session may be initiated by the registration device via one or more user interfaces (e.g., a graphical interface, a voice interface, etc.) provided by the registration device. In some embodiments, another device (e.g., car keys having an interface such as a button for initiating trip sessions) may be used to transmit data (e.g., via Bluetooth, via WiFi, via a cellular network, etc.) to the registration device requesting a trip session to be generated. In some embodiments, generating a trip session may include instantiating a registration object and/or a vehicle object and/or occupant object (or other suitable data container) with which corresponding registration data (e.g., vehicle metadata and/or occupant metadata) may be stored.

In some embodiments, a trip session may be generated automatically based on context (e.g., as a result of one or more determinations). For example, a registration device may be configured to determine that it is being utilized, or is likely to be utilized for transportation. By way of example, the registration device may determine it is being utilized and/or is likely to be utilized based at least in part on determining a Bluetooth pairing procedure (e.g., a pairing procedure executed with the mobile device 102 and the vehicle 104) has been completed, based on determining that the registration device is being used for directions, based on determining the speed at which the registration device is traveling has exceeded a threshold value, based on detecting an audio signature of a vehicle cabin being, and the like. As another example, a microphone of a registration device may capture sound coming from the vehicle and an analysis of this sound may enable the registration device to detect that it is collated within a vehicle. In some embodiments, certain attributes of the sound (e.g., the frequency, pitch, oscillations, etc.) may be utilized to identify a particular vehicle by comparing the captured sound to predefined sounds for which an association to a particular vehicle is known. In some embodiments, the registration device may generate a trip session in response to determining that it is being utilized, or is likely to be utilized for transportation.

At 204, the registration device may present an interface (e.g., a graphical and/or audio interface) asking the user if they would like to pair the mobile device and the vehicle. If user input is received (e.g., audibly, or via the graphical interface) that indicates the user does not want to pair the devices, the registration may determine that no vehicle metadata is to be associated with the trip session at block 206 and the method 200 may proceed to block 216.

Alternatively, if the user input obtained at 204 indicates that the user wants to pair the mobile device and the vehicle, the method may proceed to block 206 where the mobile device and the vehicle may be used to execute any suitable pairing procedure such that the two devices may be communicatively connected by the pairing. Upon completing this pairing, the method 200 may proceed to block 210. It should be appreciated that steps 204-208 are optional and, in some embodiments, one or more of steps 204-208 may be skipped. For example, if the trip session generated at block 202 was generated based at least in part on the mobile device being paired with the vehicle, then the method may determine the existence of the pairing at 204 and proceed to 210 without performing a pairing procedure as indicated at block 208. In yet another example, a trip session may be generated at 202 and the method may proceed directly to 214 described below.

At 210, the registration device may be configured to determine whether the vehicle has already been registered. By way of example, vehicle metadata may have previously been obtained (e.g., from the user, using the mobile device, from the vehicle, using an interface of the mobile device and/or the vehicle, etc.). In some embodiments, this vehicle metadata may be stored with an identifier (e.g., "Mom's SUV"). The user may be provided an interface via the registration device from which the user may indicate the vehicle has already been registered (e.g., by indicating in the affirmative that the vehicle has already been registered). When the vehicle has already been registered as identified at 210, the method may proceed to 212 where the user may be provided the option of selecting a vehicle from a list of previously-registered vehicles. It should be appreciated that the operations of 210 and 212 may be combined in some embodiments such that selecting a previously registered vehicle is, in and of itself, both an indication that the vehicle has already been registered and a selection of the previously-registered vehicle.

If the user selects a vehicle at 212, or the user indicates the vehicle has not already been registered (e.g., by selecting an interface element that indicates the user wishes to register a vehicle), the method 200 may proceed to block 214 where vehicle metadata may be obtained, augmented, or added. By way of example, the user may be provided any suitable graphical and/or audio interface (e.g., via the mobile device, via the vehicle) with which vehicle metadata may be obtained, augmented, and or added.

By way of example, the mobile device (and/or the vehicle) may be utilized at block 214 to obtain any suitable portion of vehicle metadata utilizing one or more interfaces and/or one or more input/output devices (e.g., a keyboard, a microphone, a display, a speaker, etc.). For example, in some embodiments, the mobile device and/or the vehicle may present a graphical interface with which the user may provide any suitable user input to identify any suitable portion of vehicle metadata. In some embodiments, the mobile device and/or vehicle may be configured to audibly request the user to provide (e.g., vocally, via a graphical interface) vehicle metadata for the vehicle. The mobile device and/or the vehicle may be configured to receive such user input and store the received data as vehicle metadata in an object (or another suitable storage container) associated with the vehicle.

In some embodiments, a camera (e.g., a camera of the mobile device, a third-party device such as an aftermarket camera attached to the vehicle, or any suitable device configured to capture images) may be utilized to capture one or more images of the vehicle at 214. Additionally, or alternatively, one or more images may be obtained from a picture library on the mobile device or one or more images from another user device. The mobile device may be configured to utilize any suitable image recognition techniques to identify one or more vehicle attributes from the one or more images (e.g., still images, video, etc.). By way of example, the mobile device may store a machine-learning model that has been previously trained to identify vehicle attributes from input data (e.g., one or more images of the vehicle). In some embodiments, the machine-learning model may be previously trained using any suitable supervised, unsupervised, semi-supervised, and/or reinforcement learning techniques. As a non-limiting example, the machine-learning model may be trained using a supervised learning technique (e.g., a classification algorithm, regression analysis, etc.) in which the model (e.g., a function) is determined for predicting an output from an input by analyzing a training data set including examples for which vehicle attributes have previously been identified. For example, the training set may include example sets of one or more images which have been previously labeled as depicting one or more vehicle attributes and/or images which have been previously identified as lacking one or more vehicle attributes. Any suitable number of vehicle attributes (e.g., color, make, model, year, dents, broken windows, blemishes, a license plate number, VIN number, registration tab data, etc.) may be captured based at least in part on the image(s) captured by the mobile device.

As another example, any suitable number of the one or more images (e.g., still images, video frames, etc.) may be compared to a database of known images, three dimensional models, renderings corresponding to one or more vehicles, or the like. If the mobile device determines the one or more images are similar (e.g., to some threshold degree, with a threshold degree of confidence, etc.) to one or more images corresponding to a particular vehicle of the database, the mobile device may be configured to determine that the vehicle shares the same attributes as those associated in the database with the particular vehicle and may store those vehicle attributes as vehicle metadata within the object stored at the mobile device.

In some embodiments, vehicle metadata provided via user input may be preferred over vehicle metadata derived in any other manner. For example, if the user has specifically indicated through user input that the vehicle is a particular make and model, but the mobile device and/or the vehicle has determined, via image recognition techniques, that the vehicle is a different make and/or model, the user-provided vehicle metadata may be utilized and the make and model determined by the mobile device and/or vehicle may be disregarded. In some embodiments, the user-provided vehicle metadata may be preferred and conflicting vehicle metadata may always be discarded, while in other embodiments, the conflicting vehicle metadata may be discarded unless the same conflicting vehicle metadata has been received over a threshold number of times and/or from a threshold number of different sources (e.g., other V2X vehicles, other proxy devices, roadside units, via the use of image recognition techniques with one or more images of the vehicle). The vehicle metadata provided by any suitable source may be stored (e.g., in a common object, in multiple objects specific to the source of the data, etc.) and utilized or disregarded based at least in part on a predetermined rule set.

In some embodiments, vehicle attributes of the vehicle metadata (e.g., a physical attributes of the vehicle) may be associated with a classification identifying a degree of persistence of the attribute. For example, a vehicle attribute may be classified as temporary (e.g., by the user and/or by a predetermined rule set). If classified as temporary, the attribute may be changed at any suitable time based on any suitable update. These attributes may also be deleted from the vehicle metadata upon completion of the session. The trip session may be deemed to be completed upon determining the vehicle has remained stationary for over a threshold period of time, upon determining the vehicle and/or mobile device has arrived at a known location (e.g., the user's home), upon determining a destination identified in a set of directions has been reached (e.g., based on the location of the mobile device and/or the vehicle), based on direct user input indicating the trip session is complete, upon determining the mobile device and vehicle are no longer paired, or based on any suitable stimulus. Example temporary vehicle attributes may include, but are not limited to, dirt/frost/snow on the vehicle, one or more rolled down/up windows, an indicator that the windshield wipers are on or off, an indication that a turn signal is on/off (and/or which turn signal is on/off), an indication that the vehicle's hazard lights are flashing, an indication the vehicle's brake lights are on/off, an indication that a spoiler of the vehicle is up or down, an indication that a sunroof of the vehicle is opened/closed, a passenger count (for a public transportation vehicle), an absolute location of the vehicle, motion vectors of the vehicle, to name a few.

In some embodiments, a vehicle attribute (e.g., a physical attribute of the vehicle) may be classified as being unchanging for the given trip session and deleted from the vehicle metadata upon completion of the session (where completion is determined based on the factors described above). Example of attributes that are unchanging for a given trip session may include, but are not limited to, visible cargo (e.g., a surfboard, ladder, construction material, etc.), passenger count (for a personal vehicle), and the like.

In some embodiments, a vehicle attribute (e.g., a physical attribute of the vehicle) may be classified as unchanging over multiple driving sessions. These attributes may be deleted and/or modified only by user input indicating deletion is desired. Example vehicle attributes that may be classified as unchanging over multiple driving sessions may include, but are not limited to, window/bumper sticker(s), window tinting, damage to vehicle, and the like. Similarly, a vehicle attribute can be classified as permanent/typically permanent. Permanent/typically permanent attributes may also be deleted and/or modified only by user input. Example permanent/typically permanent attributes may include, but are not limited to license plate numbers, an indicator that the vehicle includes a roof rack (and/or type of rack), aftermarket modifications (e.g., modification to lights, panels, spoilers, etc.) vehicle color, type of rims, and the like. Attributes of these two classifications may persist in storage (e.g., within a data container storing the vehicle metadata) indefinitely until deleted and/or altered by the user.

In some embodiments, a vehicle attribute (e.g., vehicle capabilities) may include any suitable combination of the onboard hardware and/or software ADAS capabilities of the vehicle and/or the hardware and/or software capabilities of the mobile device, and/or the hardware and/or software capabilities of the mobile devices of any suitable number of the vehicle occupants. In some embodiments, the vehicle attributes corresponding to the vehicle capabilities may be identified based on ascertaining the particular capabilities associated with the vehicle and/or the mobile device(s) (e.g., one or more sensors of each device, one or more transceivers, one or more radios, one or more GNSS, one or more cameras, one or more accelerometers, one or more thermal sensors, etc.). The devices (e.g., the vehicle, the mobile device, and/or the mobile devices of the passengers) may be configured to data describing one or more of their capabilities with one another via any suitable communications protocol and/or channel (e.g., via Bluetooth, via WiFi, via a cellular network, etc.). Any suitable attribute describing a vehicle capability (e.g., an ADAS capability, one or more sensors, etc.) may be stored as vehicle metadata.

In some embodiments, a vehicle attribute corresponding to a vehicle capability and/or a capability of the mobile device acting as proxy (collectively referred to as a vehicle capability attribute) may be associated with a classification indicating a degree of persistence. By way of example, a vehicle capability attribute may be classified as temporary for a given driving session. These temporary vehicle capability attributes may be updated and/or deleted from vehicle metadata at any suitable time during the trip session (e.g., a user's mobile phone may be powered off). As another example, a vehicle capability attribute may be classified as unchanging for a given driving session. This classification may be provided according to a predefined scheme and these vehicle capability attributes may be "locked" not allowed to be used for a given driving session and would remain locked until the driving session is completed (as determined by the techniques described above). Thus, in some embodiments, vehicle capability attributes identified as unchanging for a given trip session may be deleted from vehicle metadata upon completion of the trip session. As yet another example, a vehicle capability attributes may be classified as permanent/typically permanent. This classification may be utilized for vehicle capabilities such as the ADAS sensors of a vehicle (e.g., whether stock or aftermarket). In some embodiments, capabilities that are classified as permanent/typically permanent may not be deleted and/or altered unless by user input.

Returning to the method 200, at 216, the user may be asked via one or more user interfaces whether they wish to add a driver and/or passenger to the trip session. If the user answers "no," the method 200 may proceed to 218, where no passenger and/or driver metadata is collected. The method may then proceed to block 222.

Alternatively, if the user indicates a desire to add a passenger and/or driver, the method 200 may proceed to block 220. At 220, the user may utilize any suitable interface of the mobile device (or the vehicle) to provide various occupant attributes for the driver and/or one or more passengers. Occupant attributes may include any suitable combination of an identifier for the occupant (e.g., a name of the occupant), driving credential information associated with the occupant (e.g., a driver's license, driver's permit, driving certification, or the like associated with the occupant), an indication that the occupant is the current driver, one or more physical attributes of the occupant (e.g., brown hair, short hair, glasses, height, skin tone, etc.), driving experience data associated with the occupant (e.g., a number of years since the occupant first obtained his/her license, a number and/or respective types of accidents, a number and/or respective types of tickets, special training obtained by the driver, etc.), user preference information (e.g., indicating one or more user preferences for generating and/or presenting driver assistance information), one or more occupant attributes (not included in any of the attributes listed above, or any suitable combination thereof. Any suitable occupant metadata may be stored in an object (or another suitable storage container) specific to the occupant (e.g., one object per occupant) and/or the occupant metadata of all the occupants of the vehicle may be stored in a common object and distinguished from one another by any suitable means.

At 222, any suitable combination of the vehicle metadata and/or occupant metadata (collectively, registration data) may be utilized to process data messages and/or operate the vehicle and/or perform operations. By way of example, any suitable combination of the registration data may be utilized to determine whether a received data message is relevant to the vehicle. For example, physical attributes and/or identifiers of previously stored vehicle metadata may be compared to attributes provided in a received data message to identify whether some portion of the data provided in the message is relevant to the vehicle (e.g., more than a threshold number of attributes of the message match vehicle attributes of the vehicle metadata). If so, the message may be processed (e.g., by the receiving device which in some embodiments may be the vehicle, in other embodiments, it may be the mobile device operating as a proxy for the vehicle). Else, the message (or that portion of the message) may be discarded and/or ignored. As another example, the data message may be deemed relevant if data corresponding to vehicle attributes indicates a location within a threshold distance of the vehicle's known location. Thus, the vehicle and/or the proxy device may store vehicle metadata and/or occupant metadata obtained from multiple sources (e.g., user entered, received from a remote device, etc.). Any suitable rule set may be utilized to determine what data is to be utilized when conflicting data occurs.

Figure 6:
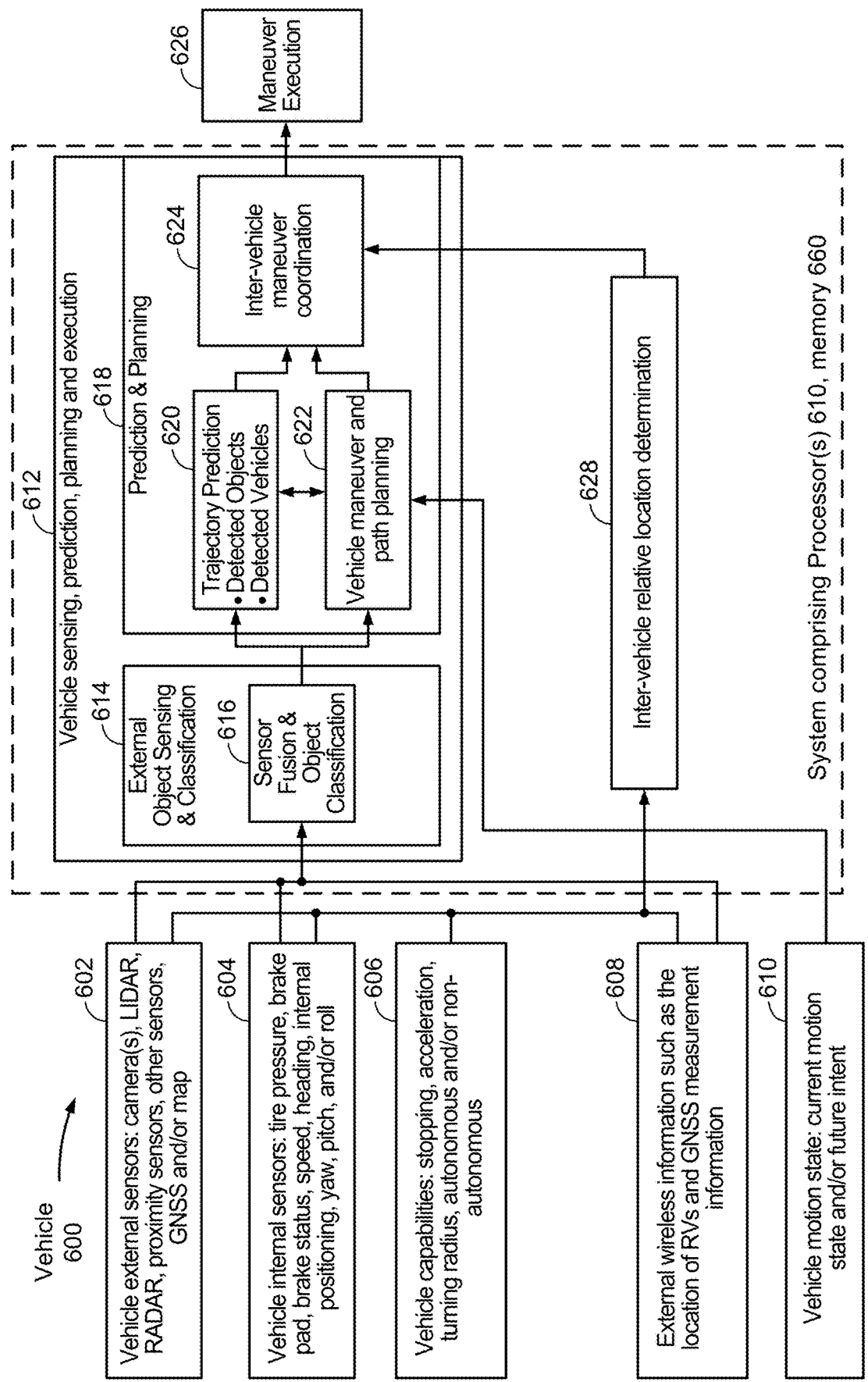
FIG. 6 comprises a functional block diagram of a vehicle, according to an embodiment.

In some embodiments, the vehicle may be configured to perform maneuvers automatically as described in further detail in FIG. 6. If a data message is processed (after being determined to be relevant to the vehicle) the data elements may be utilized as input in order to determine a maneuver to be executed as described in connection with FIG. 6.

In some embodiments, one or more operations may be performed in response to processing data messages. By way of example, if the data message includes vehicle metadata, such vehicle metadata may be used to augment vehicle metadata stored at the receiving device. In some embodiments, the particular values of these attributes may be required to be received over a threshold number of times and/or from at least a threshold number of sources before those values may be stored in the object/container associated with the vehicle. Until these conditions are met, the received attributes may be temporarily stored in a separate container (e.g., separate objects, containers, logs, etc.) such that the receiving device can ascertain how many times, and/or from how many sources, the particular attribute has been received. In some embodiments, the object/container associated with the vehicle may store user-entered and received attributes in separate data fields. If common data fields are used for user-entered and received attributes, a rule set may be employed to define rules for when one type of attribute may overwrite the other.

It should be appreciated that any of the operations depicted in FIG. 2 may be performed by the mobile device, by the vehicle device, or by some combination of the mobile device and the vehicle device. In some embodiments, any suitable portion of the operations described above may be performed by the mobile device, or alternatively the vehicle, and the data resulting from the performance of such operations may be shared between the devices. For example, the mobile device may be utilized to capture images of the vehicle and may submit those images to the vehicle which may be configured to identify (e.g., using the image recognition techniques described above) that the images depict a vehicle having particular attributes. The vehicle may store these attributes in memory and/or may provide these attributes to the mobile phone for storage. In a similar manner, the mobile device and the vehicle may cooperatively utilized to perform any suitable portion of the operations discussed in connection with FIG. 2.

Although not depicted, it should be appreciated that any suitable combination of vehicle metadata and/or occupant metadata from any suitable source may be transmitted by the vehicle or by a mobile device operating as a proxy for the vehicle according to any suitable transmission protocol. In some embodiments, the transmitted message may be broadcasted and/or directed to a particular remote device.

Figure 3:
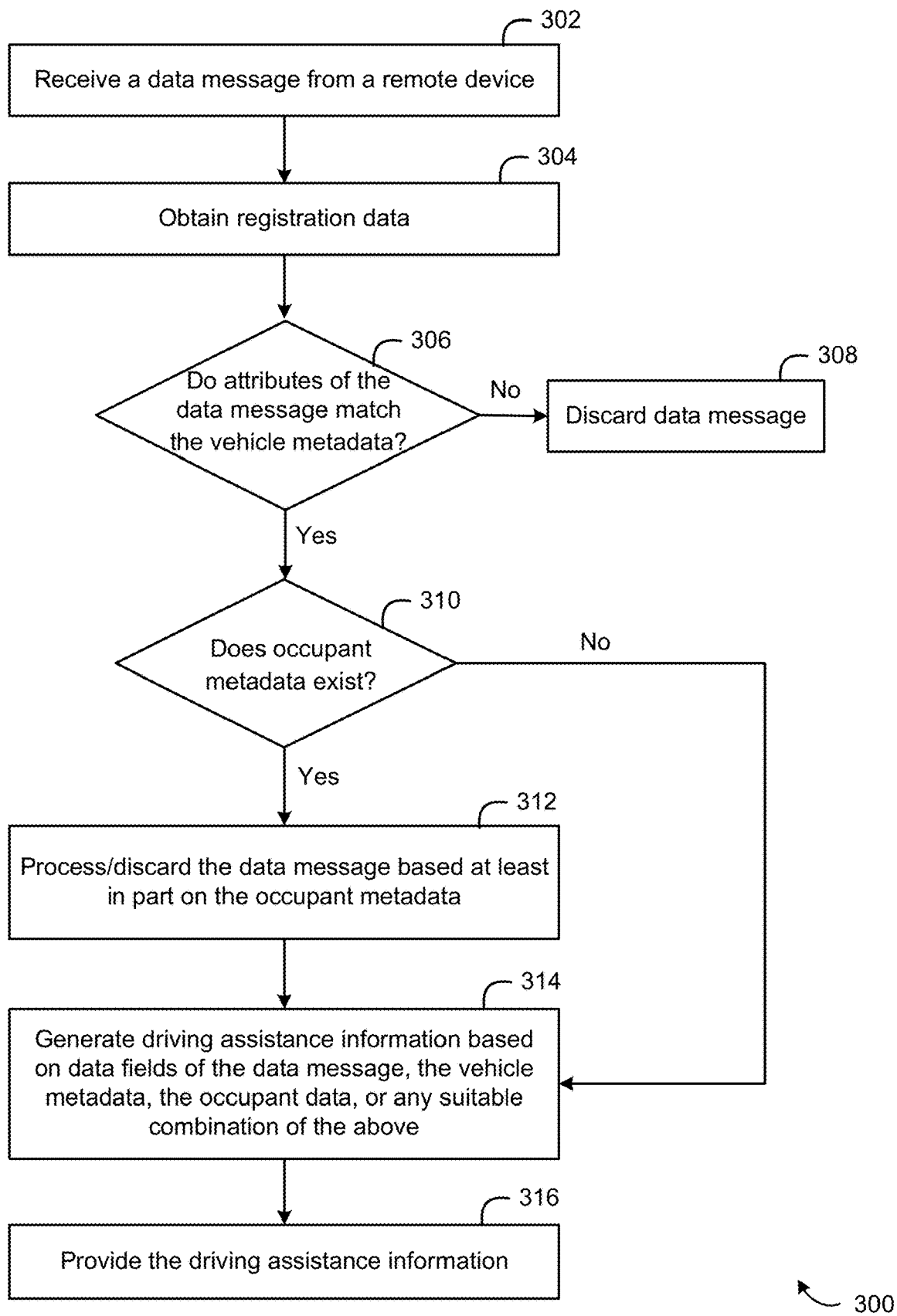
FIG. 3 is a flowchart depicting a method for generating driver assistance information based on data elements of a data message received from a remote device, according to an embodiment.

FIG. 3 is a flowchart depicting a method 300 for generating driver assistance information (e.g., the driver assistance information 122 of FIG. 1) based on data elements of a data message received from a remote device (e.g., the RV 110 of FIG. 1, the roadside unit 112 of FIG. 1), according to an embodiment. As described above in connection with FIG. 1, driver assistance information may include alerts, alarms, graphical presentations, audible presentations, and the like, that inform the driver of a particular situation (e.g., environmental conditions such as icy roads, snow, smoke, and the like, road conditions such as corresponding locations of obstacles in the road, vehicle actions such as a vehicle merging into your lane or a lane next to you, breaking (and/or a degree of breaking) of a vehicle in front of you, or any suitable data that can indicate any suitable driving situation). It should be appreciated that the operations of method 300 may be an example of the operations performed at 222 of FIG. 2. The operations of method 300 may be performed by the vehicle 104 of FIG. 1 (e.g., an example of the vehicle 700 of FIG. 7) or by the mobile device 102 (e.g., an example of the proxy device 900 of FIG. 9) operating as a proxy for vehicle 104.

The method 300 may begin at block 302, where a data message may be received from a remote device. For example, the data message 106 of FIG. 1 may be received (e.g., from the RV 110, the roadside unit 112, the servers of FIG. 5, or any suitable device of the a V2X environment). The data message may be any suitable V2X message and may include any suitable combination of data. By way of example, the data message may include data attributes associated with the transmitting vehicle and/or one or more objects (e.g., other vehicles, stationary and/or moving objects in the road, bicycles, etc.) sensed by the transmitting vehicle. In some embodiments, the data message may include attributes of the receiving vehicle as sensed by one or more sensors of the transmitting vehicle. In some embodiments, the data message may include attributes of vehicles and/or objects as sensed by vehicles other than the transmitting vehicle.

At block 304, registration data may be obtained. Registration data may include any suitable combination of vehicle metadata associated with the vehicle and/or occupant metadata associated with one or more occupants of the vehicle. As described above in connection with FIG. 2, some portion of this registration data may be stored in memory of the receiving device (or at least accessible by the receiving device from another device in communication with the receiving device). In some embodiments, a portion of the registration data may be obtained from one or more user devices. By way of example, multiple occupants of the vehicle may carry a respective user device. Each user may have previously provided their own occupant metadata which may be stored in memory of their respective user device. In some embodiments, the occupant metadata stored at a given user device may be obtained in response to determining (e.g., by the vehicle and/or by the mobile device of the driver) that the user device is near. The vehicle and/or mobile device of the driver may receive a location provided by the user device and compare said location with its own to determine that the user device is near (e.g., within a threshold distance). As another example, the vehicle and/or mobile device can detect, via Bluetooth, that the user device is near based at least in part on signal strength and/or an availability of the user device for pairing with the vehicle and/or the driver's mobile device.

At block 306, a determination may be made of whether the attributes of the data message (or some threshold number of attributes of the data message) match the vehicle metadata stored at the receiving device. If the attributes of the data message do not match the stored vehicle metadata (or at least a threshold number of attributes of the data message do not match the stored vehicle metadata), the method 300 may proceed to block 308, where the data message may be discarded. Although not depicted in FIG. 3, it is contemplated that rather than discarding the data message entirely, the data message may be processed, but some portion of the data message may be ignored based at least in part on the determination at 306.

If it is determined that the attributes of the data message match the vehicle metadata, the method 300 may proceed to 310, where a determination may be made as to whether occupant metadata exists (e.g., occupant metadata corresponding to one or more occupants). If no occupant metadata exists, the method 300 may proceed to block 314. If occupant metadata does indeed exist, the method 300 may proceed to block 312.

At block 312, the data message may be processed or discarded based at least in part on the occupant metadata. As a non-limiting example, the data message may include attributes indicating a number of occupants detected in the vehicle and/or any suitable combination of physical attributes of the occupants of the vehicle. As a non-limiting example, a remote device may capture image(s) and/or video of the vehicle and may analyze based on any suitable image recognition technique the image(s)/video to determine a number of occupants of the vehicle and/or one or more attributes of the occupants. By way of example, the remote device may utilize a machine-learning model trained with supervised learning techniques and a data set including examples of vehicle images/videos for which the number of passengers and attributes of each passenger have been previously identified. The image(s)/video captured by the remote device may be provided as input to the machine-learning model and the number of passengers and/or attributes of one or more passengers may be provided as output. In some embodiments, this data may be provided in the data message received at 302 and compared by the receiving device to stored occupant metadata stored at the receiving device (or accessible to the receiving device). In some embodiments, if the occupant metadata provided in the data message does not match (at all, or a threshold number of occupant attributes of the data message do not match occupant attributes of the stored occupant metadata), the message may be discarded. Thus, the various attributes of the occupants as sensed by remote devices can be utilized as an indication that the data message relates or does not relate to the vehicle.

In some embodiments, the receiving device may learn of occupant attributes from remote devices. In a similar manner as discussed above in connection with vehicle metadata, user-provided occupant attribute values may be preferred over occupant attribute values obtained from a remote device. Thus, in some embodiments, one or more occupant attributes received from a remote device may not be utilized to modify user-provided occupant attribute values. In some embodiments, if the same occupant attribute value is received over some threshold number of times (and/or from some threshold number of sources), it may be used to override the user-provided occupant attribute value. Thus, the receiving device may learn of occupant attributes from remote devices without needing each occupant to manually provide these details.

At block 314, the receiving device (e.g., the mobile device 102, the vehicle 104) may generate driving assistance information based on the data fields of the data message received at 302, vehicle metadata, occupant metadata, or any suitable combination of the above. As described above, the driving assistance information may include any suitable alarm, alert, graphical and/or audible presentation that informs the driver of a situation (e.g., environmental condition, road condition, obstacles, pedestrian, bicycle, etc.). In some embodiments, the driving assistance information may include a real-time traffic model (not depicted) which can graphically depict nearby vehicles based on the sensor data collected by the mobile device and/or the vehicle, in addition to the sensor data identifying various vehicles as received in one or more data messages.

In some embodiments, the particular driver assistance information generated may depend on any suitable portion of the driver assistance information. User preferences may be obtained from the occupant metadata and utilized to determine what type of driver assistance information will be generated and/or how the generated driver assistance information will be presented. By way of example, these user preferences may indicate that the particular occupant (when driving) prefers visual presentations over auditory presentations. Accordingly, the driving assistance information generated for the occupant may include visual alerts and/or the real-time traffic model. In some embodiments, auditory components of the driving assistance information (e.g., alarms, chimes, etc.) may be suppressed altogether or at least provided at a lower priority than visual information based on these user preferences. For example, when both a visual presentation and an auditory presentation is possible for a given situation, the visual presentation may be provided and the auditory presentation suppressed. However, if an instance of driver assistance information includes only an auditory component, that driver assistance information may still be presented despite the fact the user prefers visual information. User preferences may additionally, or alternatively, designate a preferred device with which to send the driver assistance information (e.g., a mobile device display versus a vehicle display, a driver's side speaker versus all speakers of the vehicle, etc.). By way of example, user preferences may be utilized to designate what device(s) will present visual data, what device(s) will present auditory data, an ordered list of device(s) indicating a presentation priority for visual and/or auditory data, etc.) Thus, a user may designate, via user preferences, that she'd prefer visual information to be displayed at the vehicle's display and auditory information to be presented at a left front driver speaker of the vehicle or, if the left front driver speaker is unavailable for auditory presentation, she would then prefer the auditory information be presented via a speaker of her mobile phone.

At block 316, the driving assistance information may be provided by the receiving device. In some embodiments, the driving assistance information may be presented at an output device (e.g., a display, a speaker) of the receiving device and/or the driving assistance information may be presented at an output device (e.g., a display, a speaker) of a device in communication with the receiving device. By way of example, a mobile device operating as a proxy for a vehicle may present the driver assistance information via its own display and/or speaker and/or the mobile device may provide the driver assistance information to the vehicle for presentation at the vehicle's display and/or speaker.

Figure 7:
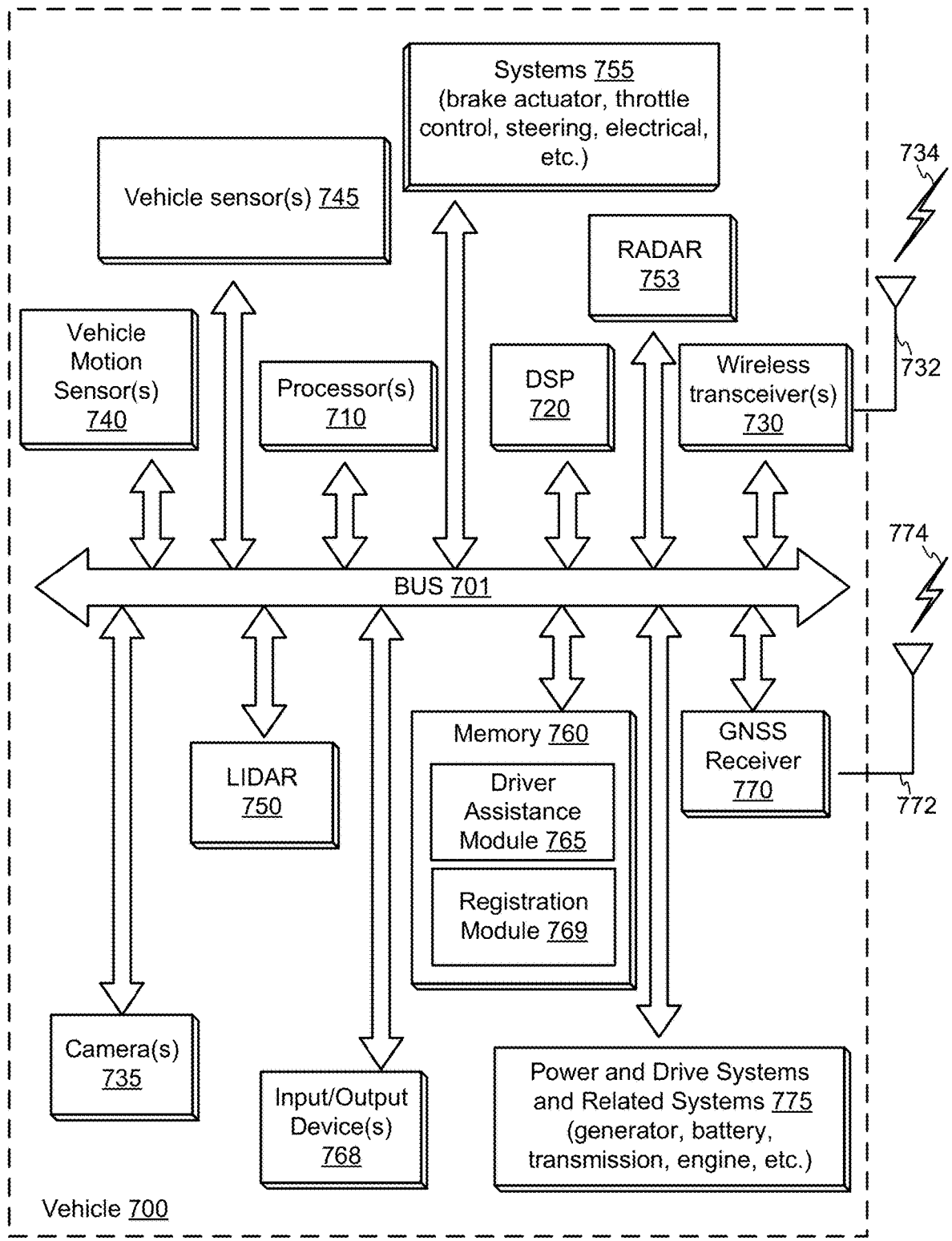
FIG. 7 is a block diagram of various hardware and software components of a vehicle, according to an embodiment.

Means for providing the driver assistance information may include any suitable combination of: software and/or hardware components of a proxy device, such as a bus 905, processor(s) 910, memory 960, wireless communication interface 930 (including a wireless transceiver), driver assistance module 965, registration module 975, output device(s) 915 of FIG. 9, which is described in more detail below, and/or one or more software and/or hardware components of vehicle (e.g., vehicle 700 of FIG. 7, a legacy vehicle lacking V2X capabilities, or a V2X capable vehicle), such as a bus 701, processor(s) 710, memory 760, wireless transceiver(s) 730 (including a wireless transceiver), driver assistance module 765, registration module 769, and input/output device(s) 768 as illustrated in FIG. 7, which is described in more detail below.

Figure 4:
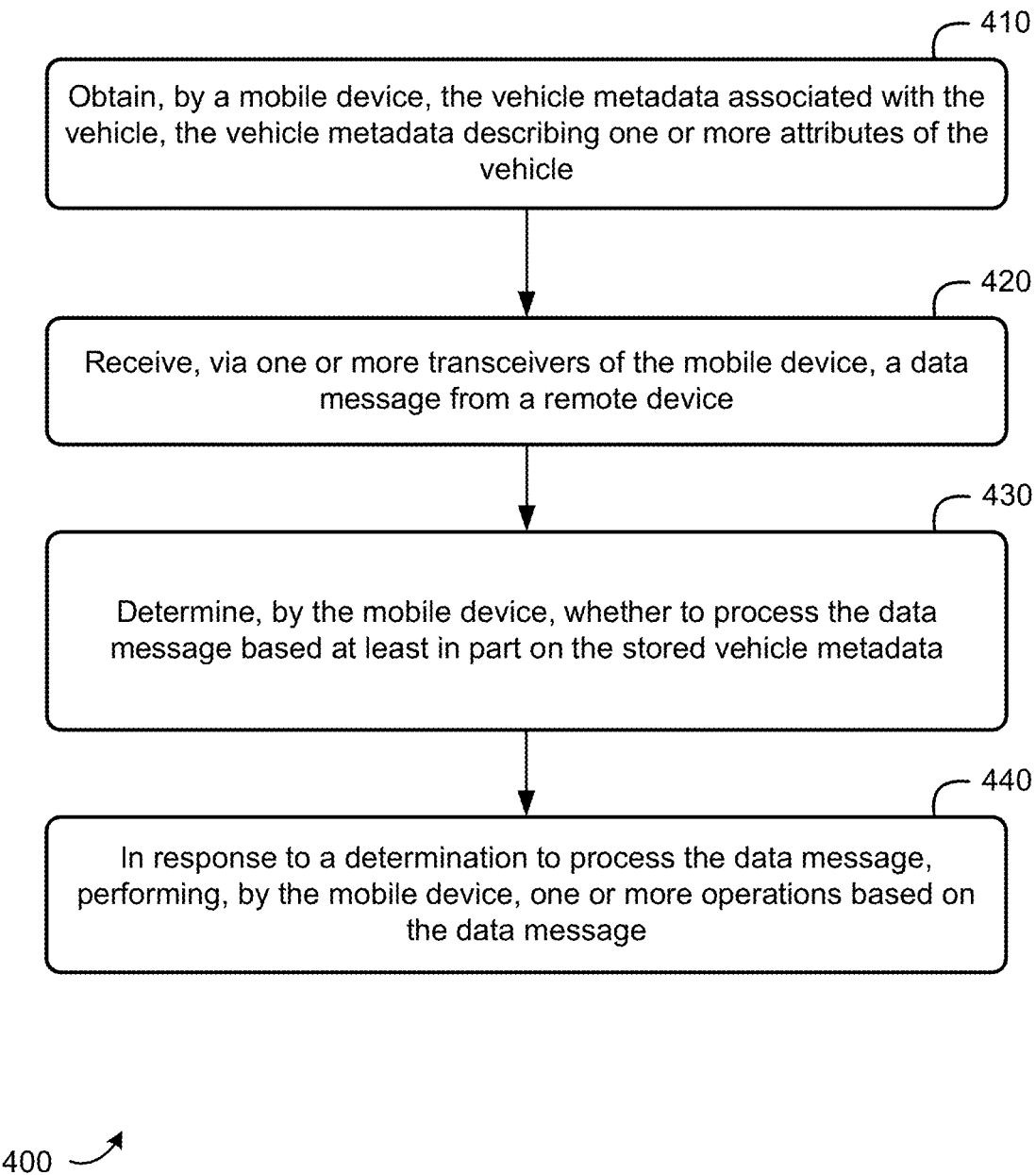
FIG. 4 is a flowchart depicting a method for utilizing, by a mobile device, vehicle metadata to perform one or more operations on behalf of a vehicle, according to an embodiment.

FIG. 4 is a flowchart depicting a method 400 for utilizing, by a mobile device, vehicle metadata to perform one or more operations on behalf of a vehicle, according to an embodiment. Means for performing method 400 may include one or more hardware and/or software components of a proxy device (e.g., a mobile device), such as those illustrated in FIG. 9, which is described below.

Method 400 may begin at block 410, where the mobile device (e.g., the mobile device 102 of FIG. 1, an example of the proxy device 900 of FIG. 9) may receive (by the processor(s) 910) vehicle metadata associated with a vehicle (e.g., the vehicle 104 of FIG. 1). In some embodiments, the vehicle 104 may be an example of a legacy vehicle (e.g., a vehicle that lacks V2X transmission and/or reception capabilities). In some embodiments, the vehicle metadata may describe one or more attributes of the vehicle such as one or more images (e.g., still or video) of the vehicle. In some embodiments, the image may be captured by a camera of the proxy device (e.g., a camera of input device(s) 970 of FIG. 9) and/or by another device and provided to the proxy device (e.g., via wireless communication interface 930) for storage. In some embodiments, the vehicle metadata may include one or more images of the vehicle, one or more identifiers associated with the vehicle, one or more capabilities of the vehicle, one or more physical attributes of the vehicle, or any combination thereof.

At 420, the mobile device may receive, via one or more transceivers (e.g., via the wireless communication interface 930), a data message from a remote device. By way of example, the remote device may include the RV 110, the roadside unit 112 of FIG. 1, one or more of the servers of FIG. 5, or any suitable device of the V2X environment that is different from the mobile device.

At 430, the mobile device (e.g., processor(s) 910) may determine whether to process the data message based at least in part on the stored vehicle metadata (e.g., the vehicle metadata stored in memory 960). Various examples are provided above in connection with FIG. 2 of the operations performed to determine whether to process or discard/ignore part the data message (or some portion of the data message) and so these examples will not be repeated here for brevity.

At 440, the mobile device may, in response to a determination to process the data message, perform one or more operations including, but not limited to, generating, presenting, and/or providing driver assistance information, determining a data element of the data message comprises additional vehicle metadata corresponding to the vehicle (and/or occupant data corresponding to one or more occupants of the vehicle), storing one or more data elements of the data message as vehicle metadata and/or occupant metadata, causing (e.g., by transmitting data and/or instructions to the vehicle) one or more vehicle maneuvers to be performed by the vehicle, transmitting additional vehicle metadata received from the data message, or any suitable combination of the above.

FIGS. 5-8 are illustrations of systems, structural devices, vehicle components, and other devices, components, and systems that can be used to implement the techniques provided herein for detecting a degree of motion sickness that a person may be experiencing while traveling in an autonomously driven vehicle.

Figure 5:
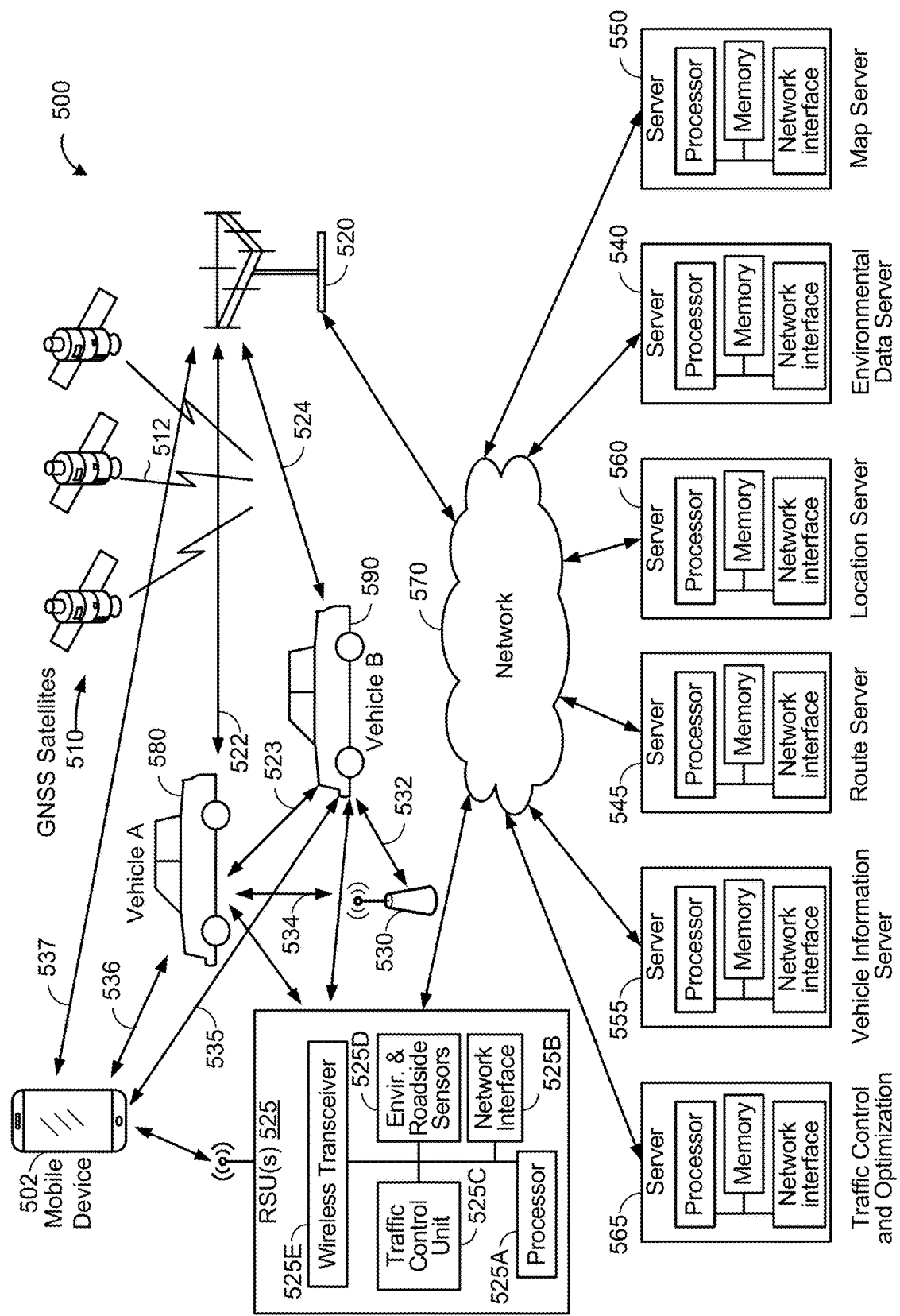
FIG. 5 is an illustration of a system in which vehicles may communicate over various networks and with various devices, vehicles, and servers, according to an embodiment.

FIG. 5 is an illustration of a system 500 in which vehicles (e.g., LV and/or RV) may communicate over various networks and with various devices, vehicles, and servers, according to an embodiment. In an embodiment, vehicle A 580 may communicate, using V2X or other wireless communication transceiver over link 523, with V2X or otherwise communication-transceiver-enabled vehicle B 590, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, and/or calculated status, vehicle metadata, occupant metadata, and to exchange other V2X vehicle status steps that may not be covered in the V2X capability data elements. In an embodiment, vehicle A 580 may also communicate with vehicle B 590 through a network, for example, via wireless signals 522 to/from base station 520 and/or via wireless signals 532 to/from an access point 530, or via one or more communication-enabled RSU(s) 525, any of which may relay communication, information and/or convert protocols for use by other vehicles, such as vehicle B 590, particularly in an embodiment where vehicle B 590 is not capable of communicating directly with vehicle A 580 in a common protocol. In an embodiment, RSU(s) may comprise various types of roadside beacons, traffic and/or vehicular monitors, traffic control devices, and location beacons.

In some embodiments, vehicle A 580 may lack V2X communication components (or such communications components are faulty and/or disabled) such that it cannot send and/or receive V2X data elements with other entities of system 500 (e.g., vehicle B 590, RSU(s) 525, servers 540, 545, 550, 555, 560, 565, etc.). A vehicle that is unable to participate in V2X communications is referred to herein as a "legacy vehicle." Thus, in some embodiments, vehicle A 580 is a legacy vehicle. In some embodiments, mobile device 502, which is discussed further below in connection with FIG. 9, may be configured to act as a proxy on behalf of vehicle A 580. Mobile device 502 can send and/or receive V2X messages for V2X with any suitable combination of the entities of the system 500 (e.g., vehicle B 590, RSU(s) 525, servers 540, 545, 550, 555, 560, 565, etc.). Mobile device 502 may be configured to send and/or receive wireless messages in various protocols with vehicle A 580 (or any suitable component of vehicle A 580) by using various Wide Area Network (WAN), Wireless Local Area Network (WLAN), and/or Personal Area Network (PAN) protocols to communicate over a wireless communication network. In an embodiment, the mobile device 502 may comprise various combinations of WAN, WLAN and/or PAN transceivers. In an embodiment, these transceivers may include a Bluetooth® transceiver, a ZigBee transceiver, and/or other PAN transceiver. A local transceiver, a WAN wireless transceiver, and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with a mobile device 502 over a wireless link, and claimed subject matter is not limited in this respect.

In some embodiments, mobile device 502 may communicate with vehicle A 580 via link 536 or through a network, for example, via wireless signals 537 to/from base station 520 and/or via wireless signals 534 to/from an access point 530, or via one or more communication-enabled RSU(s) 525, any of which may relay communication, information and/or convert protocols for use by other vehicles, such as vehicle B 590, particularly in an embodiment where vehicle B 590 is not capable of communicating directly with vehicle A 580 in a common protocol.

Mobile device 502 may be configured to receive any suitable vehicle data from any suitable combination of components of vehicle A 580 (e.g., vehicle sensor(s) 745, vehicle motion sensor(s) 740, camera(s) 735, RADAR 753, LIDAR 750, power and drive systems and related systems 775, input/output device(s) 768, and/or systems 755) via one or more communication networks. In some embodiments, mobile device 502 may be configured to receive vehicle metadata and/or occupant metadata from one or more interfaces of the mobile device 502, based on one or more images captured by the mobile device 502, from vehicle A 580, or any suitable combination of the above. Mobile device 502 may be configured with one or more sensors and may exchange locally acquired sensor data with the vehicle. In some embodiments, the mobile device 502 may be configured to interface (send and/or receive data) with the input/output device(s) 768 of FIG. 7). For example, the mobile device 502 may present data via the input/output device(s) 768 and/or the mobile device 502 may receive data (e.g., user input) collected and provided by the input/output device(s) 768 of vehicle A 580.

Mobile device 502 may be configured to generate driver assistance information (e.g., the driver assistance information 122 of FIG. 1) based at least in part on received V2X message data. By way of example, mobile device 502 may be configured with code (e.g., driver assistance module 965 of FIG. 9) that, when executed, causes visual and/or audible data (e.g., driver assistance information) to be generated that indicates at least a portion of the data received via one or more V2X messages. As a simplistic example, the mobile device 502 may receive a V2X message indicating that the vehicle located in front of vehicle A 580 is breaking hard. The mobile device 502 may determine the V2X message is relevant to vehicle A 580 and generate visual and/or audible data that may be presented at the mobile device 502 via a display and/or a speaker of the mobile device and/or at a display and/or speaker of the vehicle A 580 (e.g., via input/output device(s) 768). The visual and/or audible data may indicate the breaking is occurring up ahead, alerting the driver to the chance of collision.

Mobile device 502 may be configured to store vehicle and/or occupant metadata provided by a user or received as V2X message data. By way of example, mobile device 502 may be configured with code (e.g., the registration module 975 of FIG. 9) that may perform any suitable operations discussed herein with respect to managing, obtaining, storing, classifying, or otherwise interacting with vehicle metadata and/or occupant metadata. In some embodiments, the mobile device 502 may determine the V2X message is relevant to vehicle A 580 based at least in part on comparing vehicle metadata and/or occupant metadata received from a V2X message with vehicle metadata and/or occupant metadata stored at the mobile device. In some embodiments, the registration module 975 may be configured with code, that when executed, obtains occupant metadata from one or more nearby user devices as described in connection with FIG. 3.

Mobile device 502 may communicate, using V2X or other wireless communication transceiver over link 535, with V2X or otherwise communication-transceiver-enabled vehicle B 590, for example, in an embodiment to perform inter-vehicle relative positioning, negotiation for lane changes or for passage through an intersection, and to exchange V2X data elements such as Global Navigation Satellite System (GNSS) measurements, vehicle status, vehicle location and vehicle abilities, measurement data, vehicle metadata, occupant metadata, and/or calculated status, and to exchange other V2X vehicle status steps that may not be covered in the V2X capability data elements. In an embodiment, mobile device 502 may also communicate with vehicle B 590 through a network, for example, via wireless signals 537 to/from base station 520 and/or via wireless signals 534 to/from an access point 530, or via one or more communication-enabled RSU(s) 525, any of which may relay communication, information and/or convert protocols for use by other vehicles, such as vehicle B 590, particularly in an embodiment where vehicle B 590 is not capable of communicating directly with vehicle A 580 in a common protocol.

In an embodiment, RSU(s) 525 may have a processor 525A configured to operate wireless transceiver 525E to send and receive wireless messages, for example, BSM or Cooperative Awareness Messages (CAM) or other V2X messages to/from vehicle A 580 and/or vehicle B 590 and/or mobile device 502, from base station 520 and/or access point 530. For example, wireless transceiver 525E may send and/or receive wireless messages in various protocols such as V2X communication with vehicles, and/or using various Wide Area Network (WAN), Wireless Local Area Network (WLAN), and/or Personal Area Network (PAN) protocols to communicate over a wireless communication network. In an embodiment RSU(s) 525 may contain one or more processors 525A communicatively coupled to wireless transceiver 525E and memory, and may contain instructions and/or hardware to perform as a traffic control unit 525C and/or to provide and/or process environmental and roadside sensor information 525D or to act as a location reference for GNSS relative location between it and vehicles. In an embodiment, RSU(s) 525 may contain a network interface 525B (and/or a wireless transceiver 525E), which, in an embodiment, may communicate with external servers such as traffic optimization server 565, vehicle information server 555, and/or environmental data server 540. In an embodiment, wireless transceiver 525E may communicate over a wireless communication network by transmitting or receiving wireless signals from a wireless Base Transceiver Subsystem (BTS), a Node B or an evolved NodeB (eNodeB) or a next generation NodeB (gNodeB) over wireless communication link. In an embodiment, wireless transceiver(s) 525E may comprise various combinations of WAN, WLAN and/or PAN transceivers. In an embodiment, a local transceiver may also be a Bluetooth® transceiver, a ZigBee transceiver, or other PAN transceiver. A local transceiver, a WAN wireless transceiver and/or a mobile wireless transceiver may comprise a WAN transceiver, an access point (AP), femtocell, Home Base Station, small cell base station, Home Node B (HNB), Home eNodeB (HeNB) or next generation NodeB (gNodeB) and may provide access to a wireless local area network (WLAN, e.g., IEEE 802.11 network), a wireless personal area network (PAN, e.g., Bluetooth network) or a cellular network (e.g. an LTE network or other wireless wide area network such as those discussed in the next paragraph). It should be understood that these are merely examples of networks that may communicate with an RSU(s) 525 over a wireless link, and claimed subject matter is not limited in this respect.

RSU(s) 525 may receive location, status, GNSS and other sensor measurements, and capability information from vehicle A 580 and/or vehicle B 590 and/or mobile device 502 such as GNSS measurements, sensor measurements, velocity, heading, location, stopping distance, priority or emergency status and other vehicle-related information such as vehicle metadata, occupant metadata, and the like. In some embodiments, mobile device 502 may obtain such data from vehicle A 580. In an embodiment, environmental information such as road surface information/status, weather status, and camera information may be gathered and shared with vehicles, either via point to point or broadcast messaging. RSU(s) 525 may utilize received information, via wireless transceiver 525E, from vehicle A 580 and/or vehicle B 590 and/or mobile device 502, environmental and roadside sensors 525D, and network information and control messages from, for example, traffic control and optimization server 565 to coordinate and direct traffic flow and to provide environmental, vehicular, safety and announcement messages to vehicle A 580 and vehicle B 590.

Processor 525A may be configured to operate a network interface 525B, in an embodiment, which may be connected via a backhaul to network 570, and which may be used, in an embodiment, to communicate and coordinate with various centralized servers such as a centralized traffic control and optimization server 565 that monitors and optimizes the flow of traffic in an area such as within a city or a section of a city or in a region. Network interface 525B may also be utilized for remote access to RSU(s) 525 for crowd sourcing of vehicle data, maintenance of the RSU(s) 525, and/or coordination with other RSU(s) 525 or other uses. RSU(s) 525 may have a processor 525A configured to operate traffic control unit 525C which may be configured to process data received from vehicles such as vehicle A 580 and vehicle B 590 such as location data, stopping distance data, road condition data, identification data and other information related to the status and location of nearby vehicles and environment. RSU(s) 525 may have a processor 525A configured to obtain data from environmental and roadside sensors 525D, which may include temperature, weather, camera, pressure sensors, road sensors (for car detection, for example), accident detection, movement detection, speed detection and other vehicle and environmental monitoring sensors.

In an embodiment, vehicle A 580 may also communicate with mobile device 502 using short range communication and personal networks such as Bluetooth, Wi-Fi or Zigbee or via V2X or other vehicle-related communication protocols, for example, in an embodiment to access WAN and/or Wi-Fi networks and/or, in an embodiment, to obtain sensor and/or location measurements from mobile device 502. In an embodiment, vehicle A 580 may communicate with mobile device 502 using WAN related protocols through a WAN network, such as via WAN base station 520 or using Wi-Fi either directly peer to peer or via a Wi-Fi access point. Vehicle A 580 and/or vehicle B 590 may communicate using various communication protocols. In an embodiment, vehicle A 580 and/or vehicle B 590 may support various and multiple modes of wireless communication such as, for example, using V2X, Global System for Mobile Communications (GSM), Wideband Code Division Multiple Access (WCDMA), Code-division multiple access (CDMA), High Rate Packet Data (HRPD), Wi-Fi, Bluetooth, WiMAX, LTE, 5G new radio access technology (NR) communication protocols, etc.

In an embodiment, vehicle A 580 may communicate over WAN networks using WAN protocols via base station 520 or with wireless LAN access point 530 using wireless LAN protocols such as Wi-Fi. A vehicle may also support wireless communication using a WLAN, PAN (such as Bluetooth or ZigBee), Digital Subscriber Line (DSL) or packet cable for example.

Vehicle A 580 and/or vehicle B 590 and/or mobile device 502, in an embodiment, may contain one or more GNSS receivers (e.g., GNSS receiver 770 for vehicle A and/or B, GNSS receiver 980 for mobile device 502) for reception of GNSS signals 512, from GNSS satellites 510, for location determination, time acquisition and time maintenance. Various GNSS systems may be supported alone or in combination, using GNSS receiver xxx or other receiver, to receive signals from Beidou, Galileo, GLONASS, and/or Global Positioning System (GPS), and various regional navigational systems such as Quasi-Zenith Satellite System (QZSS) and NavIC or Indian Regional Navigation Satellite System (IRNSS). Other wireless systems may be utilized such as those depending on beacons such as, in an example, one or more RSU(s) 525, one or more wireless LAN access point 530 or one or more base stations 520. Various GNSS signals 512 may be utilized in conjunction with car sensors to determine location, velocity, proximity to other vehicles such as between vehicle A 580 and vehicle B 590.

In an embodiment, vehicle A and/or vehicle B may access GNSS measurements and/or locations determined at least in part using GNSS as provided by mobile device 502, which, in an embodiment would also have GNSS, WAN, Wi-Fi and other communications receivers and/or transceivers. In an embodiment, vehicle A 580 and/or vehicle B 590 may access GNSS measurements (such as pseudorange measurements, Doppler measurements and satellite IDs) and/or locations determined at least in part using GNSS as provided by mobile device 502 as a fallback in case GNSS receiver 770 fails or provides less than a threshold level of location accuracy.

Vehicle A 580 and/or Vehicle B 590 and/or mobile device 502 (as proxy for vehicle A 580) may access various servers on the network such as vehicle information server 555, route server 545, location server 560, map server 550, and environmental data server 540.

Vehicle information server 555, may provide information describing various vehicles such as antenna location, vehicle size and vehicle capabilities, as may be utilized in making decisions in regards to maneuvers relative to nearby cars such as whether they are capable of stopping or accelerating in time, whether they are autonomously driven, autonomous driving capable, communications capable. In an embodiment, vehicle information server 555 may also provide information in regard to vehicle size, shape, capabilities, identification, ownership, occupancy, and/or determined location point (such as, for example, the location of the GNSS receiver) and the location of the car boundaries relative to the determined location point.

Route server 545, may receive current location and destination information, and provide routing information for the vehicle, map data, alternative route data and/or traffic and street conditions data.

Location server 560, in an embodiment, may provide location determination capabilities, transmitter signal acquisition assistance (such as GNSS satellite orbital predictions information, time information approximate location information and/or approximate time information), transceiver almanacs such as those containing identification of and location for Wi-Fi access points and base stations, and, in some embodiments, additional information relative to the route such as speed limits, traffic, and road status/construction status. Map server 550 which may provide map data, such as road locations, points of interest along the road, address locations along the roads, road size, road speed limits, traffic conditions, and/or road conditions (wet, slippery, snowy/icy, etc.), road status (open, under construction, accidents, etc.). Environmental data server 540 may, in an embodiment, provide weather and/or road related information, traffic information, terrain information, and/or road quality & speed information and/or other pertinent environmental data.

In an embodiment, Vehicles 580 and 590 and mobile devices 502, in FIG. 5, may communication over network 570 via various network access points such as wireless LAN access point 530 or wireless WAN base station 520 over network 570. Vehicles 580 and 590 and mobile devices 502 may also, in some embodiments, communicate directly between devices, between vehicles and device to vehicle and vehicle to device using various short range communications mechanisms to communicate directly without going over network 870, such as via Bluetooth, Zigbee and 5G new radio standards.

FIG. 6 comprises a functional block diagram of a vehicle 600, according to an embodiment. The vehicle 600 we correspond to vehicle 104 and/or RV 110 of FIG. 1, as described in the embodiments above. Moreover, hardware and/or software components for executing the blocks shown in FIG. 6 are illustrated in FIG. 7 and described in more detail below.

As shown in FIG. 6, vehicle 600 may receive vehicle and environment information from vehicle external sensors 602, vehicle internal sensors 604, vehicle capabilities 606, external wireless information such as the location of RVs and GNSS measurement information 608 (from the environment, from other vehicles, from RSU(s), from system servers) and/or from vehicle motion state 610 (describing current and/or future motion states). The messages received by the vehicle 104 and/or RV 110 of FIG. 1 described in the embodiments above, for example, may convey the data provided in blocks 608 and/or 610. The received vehicle, sensor, and environment information may, in an embodiment, be processed in one or more processor(s) 710, DSP 720 and memory 760 (further described in FIG. 7), connected and configured to provide external object sensing and classification, prediction and planning, and maneuver execution, as well as to determine and update V2X or other wireless data element values, including GNSS data element values, and to transmit, via one or more wireless transceiver(s) 730, messaging including the determined data elements. The messaging and data elements may be sent and received via various means, protocols and standards, such as via SAE or European Telecommunications Standards Institute (ETSI) CV2X messages and data elements or other wireless and wireless V2X protocols supported by wireless transceiver(s) 730. In some embodiments, vehicle 700 may be a legacy vehicle, lacking the ability to exchange messages and/or data elements via CV2X messages and/or via wireless V2X protocols. Thus, in some embodiments, vehicle 700 may receive V2X data elements from CV2X messages received by the mobile device 502 of FIG. 5 (e.g., an example of the proxy device 900 discussed below in connection with FIG. 9). In embodiments in which the mobile device 502 of FIG. 5 acts as a proxy for the vehicle 600, any suitable data received by the vehicle 600 may additionally and/or alternatively be received by the vehicle 600 from the mobile device 502 (after the mobile device 502 has received the data from the source of the data such as the servers 540, 545, 550, 555, 560, and/or 565 of FIG. 5, the RSU(s) 525, vehicle B 590, and the like).

Inter-vehicle relative location determination block 628 may be used to determine relative location of vehicles in an area of interest. In an embodiment, GNSS data is exchanged with vehicles (e.g., RVs), or other devices such as RSUs, to determine and/or verify and/or increase the accuracy of a relative location associated with other vehicles or devices. In one embodiment, determining vehicles (or other devices) within an area of interest may utilize broadcast location information such as broadcast latitude and longitude received in messages (e.g., BSMs) from other vehicles other devices and location information for vehicle 600 to determine an approximate relative location and/or an approximate range between vehicles.

In an embodiment, other vehicle-related input sources, such as servers 555, 545, 560, 550, and 540 of FIG. 5, may provide information such as vehicle information, routing, location assistance, map data and environmental data and provide input on and/or complement and/or be used in conjunction with the other inputs, for example road location data, map data, driving condition data and other vehicle-related data inputs, used in conjunction with inter-vehicle maneuver coordination 624 to determine maneuver execution 626. In an embodiment, the map data may include locations of roadside units relative to the road location, where the vehicle may utilize relative positioning between an RSU in combination with the map data to determine positioning relative to the road surface, particularly in situations where other systems may fail such as due to low visibility weather conditions (snow, rain, sandstorm, etc.). In an embodiment, map data from map server 550 may be utilized in conjunction with relative and/or absolute data from neighboring vehicles and/or from RSU(s) 525 to determine high confidence absolute location for a plurality of vehicles and relative location with respect to the road/map. For example, if vehicle A 580 of FIG. 5 has high accuracy/high confidence location than other vehicles in communication with vehicle A 580, such as vehicle B 590 of FIG. 5 may use GNSS information for a highly accurate relative location and the highly accurate location from vehicle A 580 sent to vehicle B 590 to determine a highly accurate location for vehicle B 590, even if the systems of vehicle B 590 are otherwise unable to calculate a highly accurate location in a particular situation or environment. In this situation, the presence of vehicle A with a highly accurate location determination system provides benefits to all surrounding vehicles by sharing one or more highly accurate locations along with ongoing relative location information. Furthermore, assuming the map data from map server 550 is accurate, the ability to propagate highly accurate location data from vehicle A 580 to surrounding vehicles such as vehicle B 590 enables the surrounding vehicles to also accurately determine their relative location versus the map data, even in otherwise troublesome signal/location environments. Vehicle information server 555 may provide vehicle information such as size, shape, and antenna location which may be utilized, for example, by vehicle A or other vehicles to determine not just the relative location between the GNSS receiver on vehicle A 580 and, for example, vehicle B 590, but also the distance between the closest points of Vehicle A 580 and Vehicle B 590. In an embodiment, traffic information from the traffic control and optimization server 565 may be utilized to determine overall path selection and rerouting, used in conjunction with route server 545 (in an embodiment). In an embodiment, environmental data server 540 may provide input on road conditions, black ice, snow, water on the road and other environmental conditions which may also impact the decisions and decision criteria in inter-vehicle maneuver coordination block 624 and maneuver execution block 626. For example, in icy or rainy conditions, the vehicle 600 may execute and/or request increased inter-vehicle distance from adjacent vehicles or may choose route options that avoid road hazard conditions such as black ice and standing water.

Block 628 may be implemented using various dedicated or generalized hardware and software, such as using processor 610 (an example of processor 710 or DSP 720 of FIG. 7) and memory 760 (again, as shown in FIG. 7) or, in an embodiment, in specialized hardware blocks such as dedicated sensor processing and/or vehicle messaging cores. According to some embodiments, the location of nearby vehicles may be determined through various means such as based on signal-based timing measurements such as Round-Trip Time (RTT) and Time Of Arrival (TOA), signal strength of a broadcast signal for vehicles, and a distance determined based upon broadcast latitude and longitude from a neighboring vehicle and the current location of the vehicle. Additionally or alternatively, location of nearby vehicles may be determined from sensor measurements such as 5G New Radio (NR), Ultra wide band (UWB), Light Detection and Ranging (LIDAR), Radio Detection And Ranging (RADAR), SONAR, camera measurements, or any combination thereof. In an embodiment, some or all of blocks 602, 604, 606, 608 and/or 610 may have dedicated processing cores, for example, to improve performance and reduce measurement latency. In an embodiment, some or all of blocks 602, 604, 606, 608 and/or 610 may share processing with block 628.

Vehicle external sensors 602 may comprise, in some embodiments, cameras, LIDAR, RADAR, proximity sensors, other sensors (e.g., devices for detecting weather, rain, snow, pressure changes, vertical directionality, ground position, proximity detection, etc.), GNSS receivers 770 and received data used with the sensors such as map data, environmental data, location, route and/or other vehicle information such as may be received from other vehicles, devices and servers such as, in an embodiment, map server 550, route server 545, vehicle information server 555, environmental data server 540, location server 560, and/or from associated devices such as mobile device 502, which may be present in or near to the vehicle such as vehicle A 580. For example, in an embodiment, mobile device 502 may provide an additional source of GNSS measurements, may provide an additional source of motion sensor measurements, or may provide network access as a communication portal to a WAN, Wi-Fi or other network, and as a gateway to various information servers such as servers 540, 545, 550, 555, 560, and/or 565.

Figure 8:
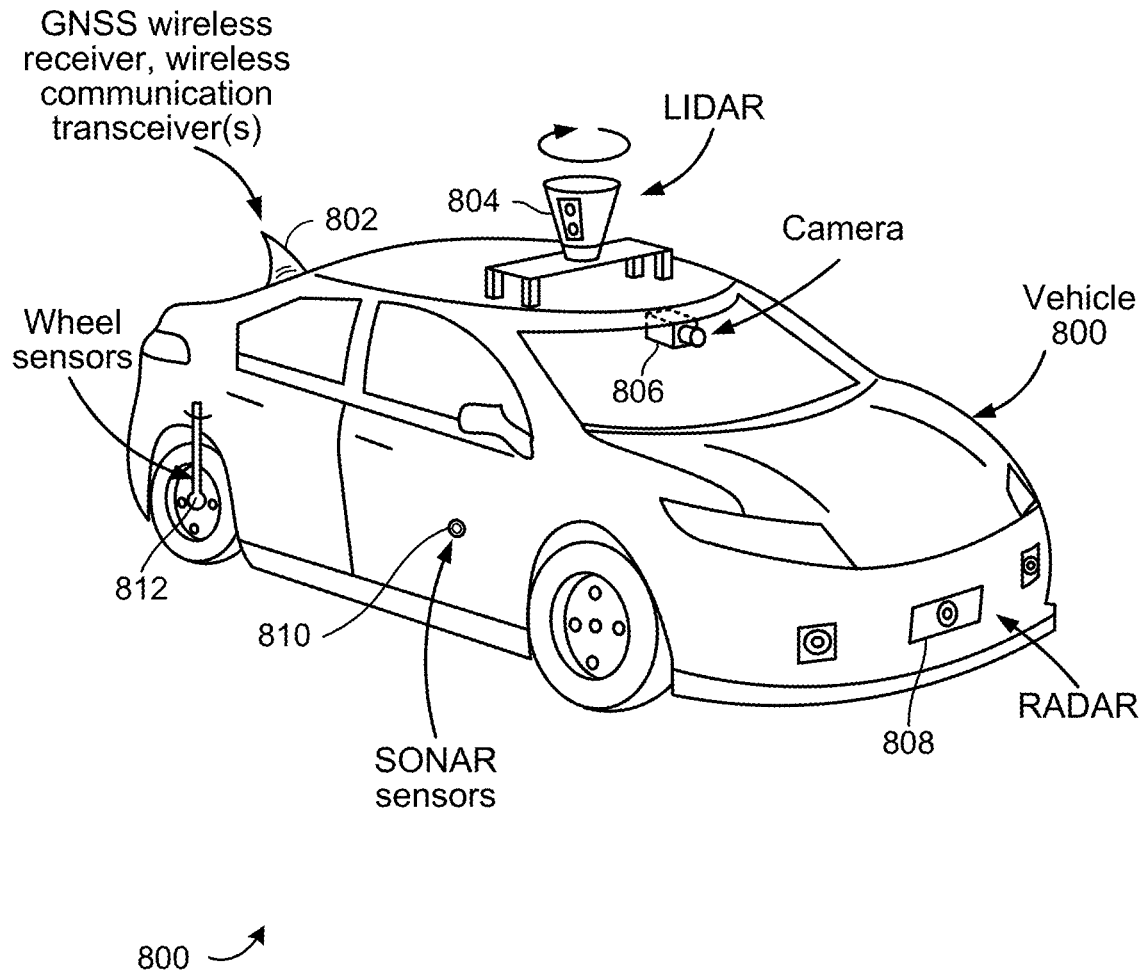
FIG. 8 is a perspective view of an example vehicle, according to an embodiment.

It is understood that the vehicle 600 may contain one or a plurality of cameras. In an embodiment, a camera may be front facing, side facing, rear facing or adjustable in view (such as a rotatable camera). As shown in FIG. 8, for example, there may be multiple cameras facing the same plane. For example, the cameras 806 may be one of two front facing cameras, one focused on lower objects and/or a lower point of view (such as bumper mounted) for parking purposes and one focusing on a higher point of view such as to track traffic, other vehicles, pedestrians and more distant objects. In an embodiment, various views may be stitched and/or may be correlated against other inputs such as V2X input from other vehicles to optimize tracking of other vehicles and external entities and objects and/or to calibrate sensor systems against each other. LIDAR 804 may be roof mounted and rotating or may be focused on a particular point of view (such as front facing, rear facing, side facing). LIDAR 804 may be solid state or mechanical. Proximity sensors may be ultrasonic, RADAR-based, light-based (such as based on infrared range finding), and/or capacitive (surface touch oriented or capacitive detection of metallic bodies). Other sensors may include various sensing capabilities and technologies such as barometric pressure sensors, devices for detecting weather, pressure changes, vertical directionality, ground position, proximity detection, moisture detectors, rain and/or snow sensors, and/or light sensors and/or may leverage other pre-existing sensor systems. GNSS receivers may be roof-mounted, such as in the fin antenna assembly at the rear of the roof of a car, hood or dash mounted or otherwise placed within the exterior or interior of the vehicle.

In an embodiment, vehicle internal sensors 604 may comprise wheel sensors 812 such as tire pressure sensors, brake pad sensors, brake status sensors, speedometers and other speed sensors, heading sensors and/or orientation sensors such as magnetometers and geomagnetic compasses, distance sensors such as odometers and wheel tic sensors, inertial sensors such as accelerometers and gyros as well as inertial positioning results using the above-mentioned sensors, and yaw, pitch and/or roll sensors as may be determined individually or as determined using other sensor systems such as accelerometers, gyros and/or tilt sensors.

Both vehicle internal sensors 604 and vehicle external sensors 602 may have shared or dedicated processing capability. For example, a sensor system or subsystem may have a sensor processing core or cores that determines, based on measurements and other inputs from accelerometers, gyros, magnetometers and/or other sensing systems, car status values such as yaw, pitch, roll, heading, speed, acceleration capability and/or distance, and/or stopping distance. The different sensing systems may communicate with each other to determine measurement values or send values to block 628 to determine vehicle location. The car status values derived from measurements from internal and external sensors may be further combined with car status values and/or measurements from other sensor systems using a general or applications processor. For example, blocks 628 and/or 624 or may be implemented on a dedicated or a centralized processor to determine data element values for V2X messaging which may be sent utilizing wireless transceiver(s) 730 or via other communication transceivers. In an embodiment, the sensors may be segregated into related systems, for example, LIDAR, RADAR, motion, wheel systems, etc., operated by dedicated core processing for raw results to output car status values from each core that are combined and interpreted to derive combined car status values, including capability data elements and status data elements, that may be used to control or otherwise affect car operation and/or as messaging steps shared with other vehicles and/or systems via V2X or other messaging capabilities. These messaging capabilities may be based on, in an embodiment, a variety of wireless-related, light-related or other communication standards, such as those supported by wireless transceiver(s) 730 and antenna(s) 732.

In an embodiment, vehicle capabilities 606 may comprise performance estimates for stopping, breaking, acceleration, and turning radius, and autonomous and/or non-autonomous status and/or capability or capabilities. The capability estimates may be based upon stored estimates, which may be loaded, in an embodiment, into memory. These estimates may be based on empirical performance numbers, either for a specific vehicle, or for averages across one or more vehicles, and/or one or more models for a given performance figure. Where performance estimates for multiple models are averaged or otherwise combined, they may be chosen based on similar or common features. For example, vehicles with similar or the same weight and the same or similar drive trains may share performance estimates for drive-performance related estimates such as breaking/stopping distance, turning radius, and acceleration performance. Vehicle performance estimates may also be obtained, for example, using external V2X input(s) 608, over a wireless network from vehicular data servers on the network. This is particularly helpful to obtain information for vehicles that are not wireless capable and cannot provide vehicular information directly. In an embodiment, vehicle capabilities 606 may also be influenced by car component status such as tire wear, tire brand capabilities, brake pad wear, brake brand and capabilities, and engine status. In an embodiment, vehicle capabilities 606 may also be influenced by overall car status such as speed, heading and by external factors such as road surface, road conditions (wet, dry, slipperiness/traction), weather (windy, rainy, snowing, black ice, slick roads, etc.). In many cases, wear, or other system degradation, and external factors such as weather, road surface, road conditions, etc. may be utilized to reduce, validate or improve performance estimates. In some embodiments, actual measured vehicle performance such as measuring vehicular stopping distance and/or acceleration time per distance, may be measured and/or estimated based on actual vehicular driving-related performance. In an embodiment, more recently measured performance may be weighted more heavily or given preference over older measurements, if measurements are inconsistent. Similarly, in an embodiment, measurements taken during similar conditions such as in the same type of weather or on the same type of road surface as is currently detected by the vehicle, such as via vehicle external sensors 602 and/or vehicle internal sensors 604, may be weighted more heavily and/or given preference in determining capability.

V2X vehicle sensing, prediction, planning execution 612 handles the receipt and processing of information from blocks 602, 604, 606, 608 and 610, via external object sensing and classification block 614, in part utilizing sensor fusion and object classification block 616 to correlate, corroborate and/or combine data from input blocks 602, 604, 606, 608 and 610. Block 614 external object sensing and classification determines objects present, determines type of objects (car, truck, bicycle, motorcycle, pedestrian, animal, etc.) and/or object status relative to the vehicle, such as movement status, proximity, heading, and/or position relative to the vehicle, size, threat level, and vulnerability priority (a pedestrian would have a higher vulnerability priority versus road litter, for example). In an embodiment, block 614 may utilize GNSS measurement messages from other vehicles to determine the relative positioning to other vehicles. This output from block 614 may be provided to prediction and planning block 618, which determines detected objects and vehicles and their associated trajectory via block 620 and determines vehicle maneuver and path planning in block 622, the outputs of which are utilized in block 626 vehicle maneuver execution either directly or via V2X inter-vehicle negotiation block 624, which would integrate and account for maneuver planning, location and status received from other vehicles. V2X inter-vehicle negotiation accounts for the status of neighboring vehicles and enables negotiation and coordination between neighboring or otherwise impacted vehicles based on vehicle priority, vehicle capabilities (such as the ability to stop, decelerate or accelerate to avoid collision), and, in some embodiments, various conditions such as weather conditions (rainy, foggy, snow, wind), road conditions (dry, wet, icy, slippery). These include, for example, negotiation for timing and order to pass through an intersection between cars approaching the intersection, negotiation for lane change between adjacent cars, negotiation for parking spaces, negotiation for access to directional travel on a single lane road or to pass another vehicle. Inter-vehicle negotiation may also include time-based and/or distance-based factors such as appointment time, destination distance and estimated route time to reach destination, and, in some embodiments, type of appointment and importance of the appointment.

FIG. 7 comprises a functional block diagram of a vehicle 700, according to an embodiment. The vehicle 700 may comprise for example, a car, bus, truck, motorcycle and/or other motorized vehicle that may, at least in part, be driven autonomously.

As shown in FIG. 7, vehicle 700 may include a variety of software and hardware components connected via bus 701. For example, the vehicle 700 may include one or more processor(s) 710 and memory 760. Memory 760 may include executable instructions, executable by the processor(s) 710, to perform autonomous driving activities including, but not limited to, external object sensing and classification, prediction and planning, maneuver execution, receiving and/or transmitting V2X messages (including in some instances some combination of vehicle metadata and/or occupant metadata). In some embodiments, memory 760 may include driver assistance module 765. Driver assistance module 765 may correspond to code that, when executed by the processor(s) 710, cause the processor(s) 710 to generate and/or present (e.g., via input/output device(s) 768 or output device(s) 915 of FIG. 9) any suitable driver assistance information based at least in part on data elements received in one or more V2X data messages. In some embodiments, memory 760 may include registration module 769. Registration module 769 may include code that, when executed by the processor(s) 710, cause the processor(s) 710 to perform any suitable operation for obtaining, soliciting, storing, receiving, transmitting, comparing, or otherwise interaction with any suitable vehicle metadata and/or occupant metadata. The registration module 769 may provide any suitable graphical and/or audible interface with which any suitable combination of vehicle metadata and/or occupant metadata maybe obtained.

Vehicle 700 may include one or more wireless transceivers, such as wireless transceiver(s) 730, for transmitting and receiving data via various means, protocols and standards, such as via SAE or European Telecommunications Standards Institute (ETSI) CV2X messages and data elements or other wireless and wireless protocols. In some embodiments, the wireless transceiver(s) 730 may be configured to transmit and receive data messages and elements via a short-range wireless communications protocol (e.g., Bluetooth®, Bluetooth Low Energy®, etc.), and/or via a local and/or wide area network, and/or via a cellular network, and/or via any suitable wireless network. Of course, it should be understood that these are merely examples of networks that may be utilized by the vehicle 700 over a wireless link, and claimed subject matter is not limited in this respect. In an embodiment, wireless transceiver(s) 730 may comprise various combinations of WAN, WLAN, and/or PAN transceivers. In an embodiment, wireless transceiver(s) 730 may also comprise a Bluetooth transceiver, a ZigBee transceiver, or other PAN transceiver.

In some embodiments, the vehicle 700 may include a Global Navigation Satellite System (GNSS) receiver 770. The GNSS receiver 770 may be configured to receive and digitally process signals from a navigation satellite (and/or other vehicles) in order to provide position, velocity, and time of the receiver. The GNSS receiver 770 may include hardware and/or software components. In an embodiment, GNSS signals from GNSS Satellites received by the GNSS receiver 770 are utilized by vehicle 700 for location determination and/or for the determination of GNSS signal parameters and demodulated data. In an embodiment, signals received by wireless transceiver(s) 730 are used for location determination, alone or in combination with GNSS signals received by the GNSS receiver 770.

Examples of network technologies that may support wireless transceiver(s) 730 are GSM, CDMA, WCDMA, LTE, 7G or New Radio Access Technology (NR), HRPD, and V2X car-to-car communication. As noted, V2X communication protocols may be defined in various standards such as SAE and ETS-ITS standards. GSM, WCDMA and LTE are technologies defined by 3GPP. CDMA and HRPD are technologies defined by the $3^{rd}$ Generation Partnership Project II (3GPP2). WCDMA is also part of the Universal Mobile Telecommunications System (UMTS) and may be supported by an HNB.

Wireless transceiver(s) 730 may communicate with communications networks via WAN wireless base stations which may comprise deployments of equipment providing subscriber access to a wireless telecommunication network for a service (e.g., under a service contract). Here, a WAN wireless base station may perform functions of a WAN or cell base station in servicing subscriber devices within a cell determined based, at least in part, on a range at which the WAN wireless base station is capable of providing access service. Examples of WAN base stations include GSM, WCDMA, LTE, CDMA, HRPD, Wi-Fi, Bluetooth, WiMAX, 7G NR base stations. In an embodiment, further wireless base stations may comprise a WLAN and/or PAN transceiver.

In an embodiment, vehicle 700 may contain one or more camera(s) 735. In an embodiment, the camera(s) 735 may comprise a camera sensor and mounting assembly. Different mounting assemblies may be used for different cameras on vehicle 700. For example, front facing cameras may be mounted in the front bumper, in the stem of the rear-view mirror assembly or in other front facing areas of the vehicle 700. Rear facing cameras may be mounted in the rear bumper/fender, on the rear windshield, on the trunk or other rear facing areas of the vehicle. The side facing mirrors may be mounted on the side of the vehicle such as being integrated into the mirror assembly or door assemblies. The cameras may provide object detection and distance estimation, particularly for objects of known size and/or shape (e.g., a stop sign and a license plate both have standardized size and shape) and may also provide information regarding rotational motion relative to the axis of the vehicle such as during a turn. When used in concert with the other sensors, the cameras may both be calibrated through the use of other systems such as through the use of LIDAR, wheel tick/distance sensors, and/or GNSS to verify distance traveled and angular orientation. The cameras may similarly be used to verify and calibrate the other systems to verify that distance measurements are correct, for example by calibrating against known distances between known objects (landmarks, roadside markers, road mile markers, etc.) and also to verify that object detection is performed accurately such that objects are accordingly mapped to the correct locations relative to the car by LIDAR and other system. Similarly, when combined with, for example, accelerometers, impact time with road hazards, may be estimated (elapsed time before hitting a pot hole for example) which may be verified against actual time of impact and/or verified against stopping models (for example, compared against the estimated stopping distance if attempting to stop before hitting an object) and/or maneuvering models (verifying whether current estimates for turning radius at current speed and/or a measure of maneuverability at current speed are accurate in the current conditions and modified accordingly to update estimated parameters based on camera and other sensor measurements).

In some embodiments, at least some of camera(s) 735 may be inward facing. The camera(s) 735 may be utilized to capture one or more images from which vehicle data may be derived (e.g., an image of the speedometer from which speed can be derived, an image of a heading indicator from which a heading may be derived, etc.). In some embodiments, camera(s) 735 may be utilized to capture one or more images of at least some portion of one or more of the vehicle occupants.

Vehicle motion sensor(s) 740 may include any suitable number of accelerometers, gyros, and/or magnetometers. In some embodiments, the vehicle motion sensor(s) 740 may be part of an inertial measurement unit of the vehicle 700. The vehicle motion sensor(s) 740 may be utilized to provide and/or verify motion and directional information, to monitor wheel and drive train performance, and/or to measure amplitude and frequency of oscillations of the vehicle 700 and/or parts of the vehicle 700. By way of example, an accelerometer (e.g., a 3-axis accelerometer) can measure vibrations of the vehicle 700 such as movement or mechanical oscillation about an equilibrium position of a component of the vehicle 700. Accelerometers, in an embodiment, may also be utilized to verify actual time of impact with road hazards such as pot holes relative to predicted times based on existing stopping and acceleration models as well as steering models. Gyros and magnetometers of the vehicle sensor(s)

745 may, in an embodiment, be utilized to measure rotational status of the vehicle as well as orientation relative to magnetic north, respectively, and to measure and calibrate estimates and/or models for turning radius at current speed and/or a measure of maneuverability at current speed, particularly when used in concert with measurements from other external and internal sensors such as other sensors such as speed sensors, wheel tick sensors, and/or odometer measurements. In some embodiments, vehicle sensor(s) 745 may be configured to measure oscillations and/or oscillation frequency corresponding to motions performed by the vehicle 700.

The vehicle 700 may include LIDAR 750. LIDAR 750 may use pulsed laser light to measure ranges to objects. While camera(s) 735 can provide object detection, LIDAR 750 may provide a means to detect the distances (and orientations) of the objects with more certainty, especially in regard to objects of unknown size and shape. LIDAR 750 measurements may also be used to estimate rate of travel, vector directions, relative position and stopping distance by providing accurate distance measurements and delta distance measurements.

In an embodiment, power and drive systems and related systems 775 (generator, battery, transmission, engine) and systems 755 (brake, actuator, throttle control, steering, and electrical) may be controlled by the processor(s) 710 and/or hardware or software or by an operator of the vehicle or by some combination thereof. The systems 755 and power and drive systems and related systems 775 may be utilized in conjunction with performance parameters and operational parameters, to enable autonomously (and manually, relative to alerts and emergency overrides/braking/stopping) driving and operating a vehicle 700 safely and accurately, such as to safely, effectively and efficiently merge into traffic, stop, accelerate and otherwise operate the vehicle 700. In an embodiment, input from the various sensor systems such as camera(s) 735, vehicle sensor(s) 1010 (including accelerometers, gyros, manometers, etc.), LIDAR 750, GNSS receiver 770, RADAR 753, input, messaging and/or measurements from wireless transceiver(s) 730 or various combinations thereof, may be utilized by processor(s) 710 and/or DSP 720 or other processing systems to control power and drive systems and related systems 775 and systems 755.

GNSS receiver 770 may be utilized to determine position relative to the earth (absolute position) and, when used with other information such as measurements from other objects and/or mapping data, to determine position relative to other objects such as relative to other vehicles and/or relative to the road surface. To determine position, the GNSS receiver 770, may receive RF signals from one or more GNSS satellites using one or more antenna(s) 772. The GNSS receiver 770 may support one or more GNSS constellations as well as other satellite-based navigation systems. For example, in an embodiment, GNSS receiver 770 may support global navigation satellite systems such as GPS, the GLONASS, Galileo, and/or BeiDou, or any combination thereof. In an embodiment, GNSS receiver 770 may support regional navigation satellite systems such as NavIC or QZSS or a combination thereof as well as various augmentation systems (e.g., Satellite Based Augmentation Systems (SBAS) or ground based augmentation systems (GBAS)) such as Doppler Orbitography and Radio-positioning Integrated by Satellite (DORIS) or wide area augmentation system (WAAS) or the European geostationary navigation overlay service (EGNOS) or the multi-functional satellite augmentation system (MSAS) or the local area augmentation system (LAAS). In an embodiment, GNSS receiver 770 and antenna(s) 772 may support multiple bands and sub-bands such as GPS L1, L2 and L5 bands, Galileo E1, E5, and E6 bands, Compass (BeiDou) B1, B3 and B2 bands, GLONASS G1, G2 and G3 bands, and QZSS L1C, L2C and L5-Q bands.

The GNSS receiver 770 may be used to determine location and relative location which may be utilized for location, navigation, and to calibrate other sensors, when appropriate, such as for determining distance between two time points in clear sky conditions and using the distance data to calibrate other sensors such as the odometer and/or LIDAR. In an embodiment, GNSS-based relative locations, based on, for example shared Doppler and/or pseudo-range measurements between vehicles, may be used to determine highly accurate distances between two vehicles, and when combined with vehicle information such as shape and model information and GNSS antenna location, may be used to calibrate, validate and/or affect the confidence level associated with information from LIDAR, camera, RADAR, SONAR and other distance estimation techniques. GNSS Doppler measurements may also be utilized to determine linear motion and rotational motion of the vehicle or of the vehicle relative to another vehicle, which may be utilized in conjunction with gyro and/or magnetometer and other sensor systems to maintain calibration of those systems based upon measured location data. Relative GNSS positional data may also be combined with high confidence absolute locations from road-side units (RSUs), to determine high confidence absolute locations of the vehicle. Furthermore, relative GNSS positional data may be used during inclement weather that may obscure LIDAR and/or camera-based data sources to avoid other vehicles and to stay in the lane or other allocated road area. For example, using an road-side unit (RSU) equipped with GNSS receiver and V2X capability, GNSS measurement data may be provided to the vehicle, which, if provided with an absolute location of the RSU, may be used to navigate the vehicle relative to a map, keeping the vehicle in lane and/or on the road, in spite of lack of visibility.

RADAR 753, uses transmitted radio waves that are reflected off of objects. The reflected radio waves are analyzed, based on the time taken for reflections to arrive and other signal characteristics of the reflected waves to determine the location of nearby objects. RADAR 753 may be utilized to detect the location of nearby cars, roadside objects (signs, other vehicles, pedestrians, etc.) and will generally enable detection of objects even if there is obscuring weather such as snow, rail or hail. Thus, RADAR 753 may be used to complement LIDAR 750 and camera(s) 735 in providing ranging information to other objects by providing ranging and distance measurements and information when visual-based systems typically fail. Furthermore, RADAR 753 may be utilized to calibrate and/or sanity check other systems such as LIDAR 750 and camera(s) 735. Ranging measurements from RADAR 753 may be utilized to determine/measure stopping distance at current speed, acceleration, maneuverability at current speed and/or turning radius at current speed and/or a measure of maneuverability at current speed. In some systems, ground penetrating RADAR may also be used to track road surfaces via, for example, RADAR-reflective markers on the road surface or terrain features such as ditches.

Input/output device(s) 768 may include any suitable one or more audio devices (e.g., one or more speakers) and/or one or more display(s) (e.g., a dashboard display, a media display, a projected display, and the like). The input/output device(s) 768 may provide an interface through which a mobile device (e.g., mobile device 502 of FIG. 5) can provide data for presentation at vehicle 700 (e.g., in scenarios in which mobile device 502 is acting as proxy for the vehicle 700.

FIG. 8 is a perspective view of an example vehicle 800 (e.g., an example of the vehicle 700 of FIG. 7), according to an embodiment. Here, some of the components discussed with regard to FIG. 8 and earlier embodiments are shown. As illustrated and previously discussed, the vehicle 800 can have one or more camera(s) (e.g., each an example of camera(s) 735 of FIG. 7) such as a rear view mirror-mounted camera 806, a passenger facing camera (not shown), front fender-mounted camera (not shown), side mirror-mounted camera (not shown) and a rear camera (not shown, but typically on the trunk, hatch or rear bumper). Vehicle 800 may also have LIDAR 804 (an example of the LIDAR 750 of FIG. 7), for detecting objects and measuring distances to those objects; LIDAR 804 is often roof-mounted, however, if there are multiple LIDAR units, they may be oriented around the front, rear and sides of the vehicle. Vehicle 800 may have other various location-related systems such as a receiver 802 such as a GNSS wireless receiver (typically located in the shark fin unit on the rear of the roof, as indicated) and/or various wireless transceivers (such as WAN, WLAN, V2X; typically, but not necessarily, located in the shark fin), RADAR 808 (typically in the front bumper), and SONAR 810 (typically located on both sides of the vehicle, if present. Wheel sensors 812 (an example of vehicle motion sensor(s) 740 of FIG. 7) may also be present and may include wheel sensors and/or drive train sensors such as tire pressure sensors, accelerometers, gyros, and wheel rotation detection and/or counters.

In an embodiment, distance measurements and relative locations determined via various sensors such as LIDAR, RADAR, camera, GNSS, and SONAR, may be combined with automotive size and shape information and information regarding the location of the sensor to determine distances and relative locations between the surfaces of different vehicles, such that a distance or vector from a sensor to another vehicle or between two different sensors (such as two GNSS receivers) is incrementally increased to account for the position of the sensor on each vehicle. Thus, an exact GNSS distance and vector between two GNSS receivers would need to be modified based upon the relative location of the various car surfaces to the GNSS receiver. For example, in determining the distance between a rear car's front bumper and a leading car's rear bumper, the distance would need to be adjusted based on the distance between the GNSS receiver and the front bumper on the following car, and the distance between the GNSS receiver of the front car and the rear bumper of the front car. By way of example, the distance between the front car's rear bumper and the following car's front bumper is the relative distance between the two GNSS receivers minus the GNSS receiver to front bumper distance of the rear car and minus the GNSS receiver to rear bumper distance of the front car. It is realized that this list is not intended to be limiting and that FIG. 8 is intended to provide exemplary locations of various sensors in an embodiment of vehicle 800.

Figure 9:
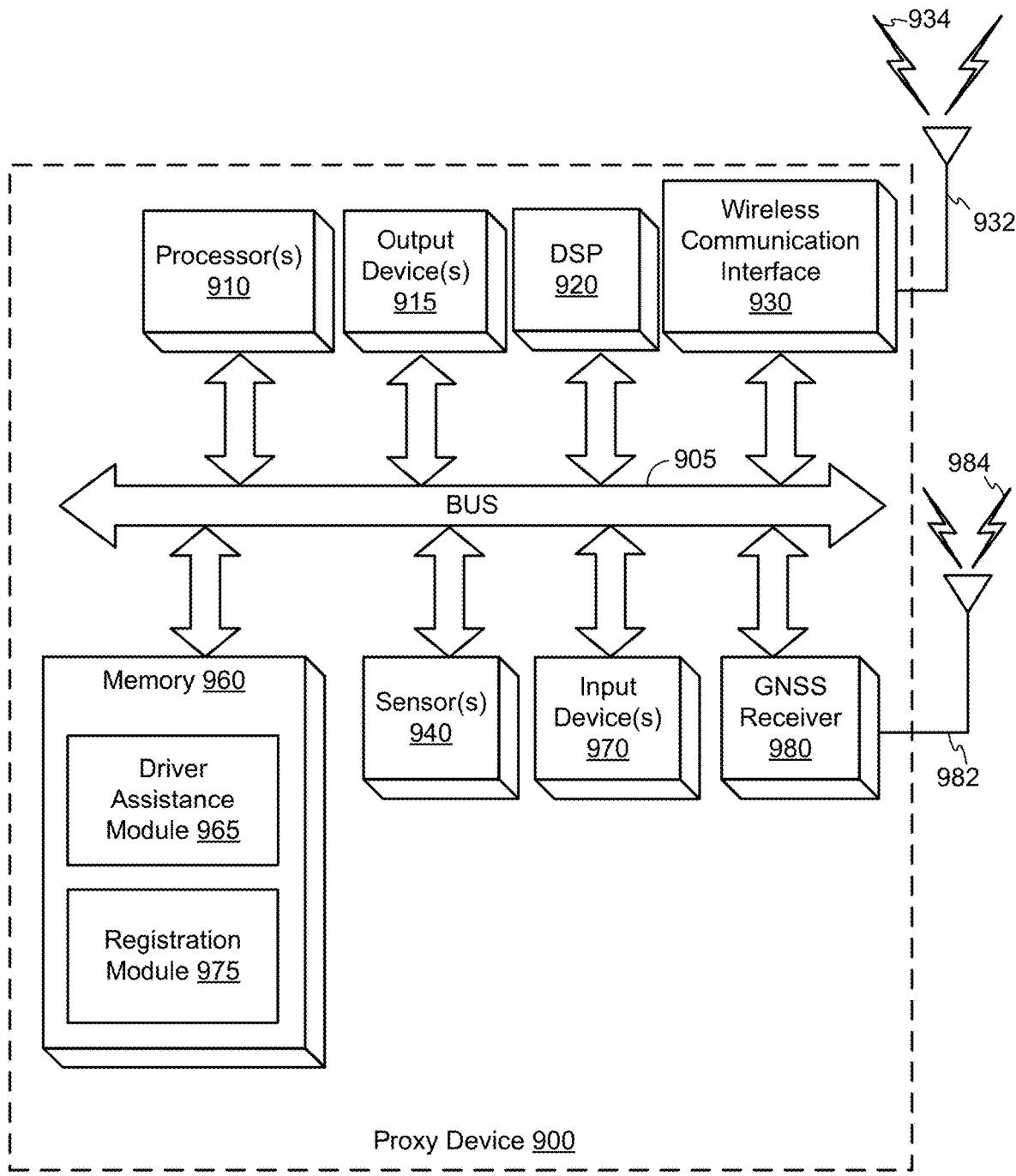
FIG. 9 comprises a functional block diagram of an example mobile device, according to an embodiment.

FIG. 9 is a block diagram of an embodiment of a proxy device 900, in accordance with at least one embodiment. According to some embodiments, the proxy device 900 may comprise a stand-alone device mobile device (e.g. a smartphone, a laptop, a tablet PC, a broadband device, customer premises equipment such as routers, gateways or other fixed mobile convergence devices, etc.), which may be communicatively coupled with other components/devices of the vehicle or RSU. It also can be noted that the proxy device 900 may be utilized in the similar manner by V2X entities other than a vehicle or RSU. Additionally, embodiments may not necessarily be limited to V2X communications. As such, alternative embodiments may include a device similar to the proxy device 900, having similar components to those shown in FIG. 9 and capable of performing the functions of the vehicles and/or RSU described in the previously-discussed embodiments, but without V2X functionality.

It should also be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be located, for example, at different physical locations on a vehicle, RSU, or other V2X entity.

The proxy device 900 is shown comprising hardware elements that can be electrically coupled via a bus 905 (or may otherwise be in communication, as appropriate). The hardware elements may include a processor(s) 910 which can include without limitation one or more general-purpose processors, one or more special-purpose processors (such as digital signal processing (DSP) chips (e.g., DSP 920), graphics acceleration processors, application-specific integrated circuits (ASICs), and/or the like), and/or other processing structure or means.

The proxy device 900 also can include one or more input device(s) 970, which can include devices related to user interface (e.g., a touch screen, touchpad, microphone, button(s), dial(s), switch(es), and/or the like). Similarly, the one or more output device(s) 915 may be related to interacting with a user (e.g., via a display, light emitting diode(s) (LED(s)), speaker(s), etc.). For example, the one or more output device(s) 915 may be utilized by the proxy device 900 to display driver assistance information 122 of FIG. 1.

The proxy device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like. The wireless communication interface 930 can enable the proxy device 900 to communicate to other V2X devices (e.g., vehicle B 590, RSU(s) 525, servers 540, 545, 550, 555, 560, and 565 of FIG. 5) and devices that lack V2X communication capabilities (e.g., vehicle A 580). This can include the various forms of communication of the previously-described embodiments. And as such, it may be capable of transmitting direct communications, broadcasting wireless signals, receiving direct and/or broadcast wireless signals, and so forth. Accordingly, the wireless communication interface 930 may be capable of sending and/or receiving RF signals from various RF channels/frequency bands. Communication using the wireless communication interface 930 can be carried out via one or more wireless communication antenna(s) 932 that send and/or receive wireless signals 934.

The proxy device 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like). Sensor(s) 940 may be used, for example, to determine certain real-time characteristics of the vehicle, such as location, velocity, acceleration, and the like. As previously indicated, sensor(s) 940 may be used to help a vehicle determine its location.

Embodiments of the proxy device 900 may also include a GNSS receiver 980 capable of receiving signals 984 from one or more GNSS satellites using an antenna 982 (which, in some embodiments, may be the same as wireless communication antenna(s) 932). Positioning based on GNSS signal measurement can be utilized to determine a current location of the proxy device 900, and may further be used as a basis to determine the location of a detected object. The GNSS receiver 980 can extract a position of the proxy device 900, using conventional techniques, from GNSS satellites of a GNSS system, such as Global Positioning System (GPS) and/or similar satellite systems.

The proxy device 900 may further comprise and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the proxy device 900 also can comprise software elements (some of which are not shown in FIG. 9) including an operating system, device drivers, executable libraries, and/or other code, such as one or more application programs, which may comprise computer programs provided by various embodiments, and/or may be designed to implement methods and/or configure systems as described herein. Software applications (e.g., the driver assistance module 965) stored in memory 960 and executed by processor(s) 910 may be used to implement the functionality providing the functionality of proxy devices as described herein. Moreover, one or more procedures described with respect to the method(s) discussed herein may be implemented as part of the driver assistance module 965 and stored in memory 960. The code/instructions of driver assistance module 965 are executable by the proxy device 900 (and/or processor(s) 910 or DSP 920 within proxy device 900) and may include the functions illustrated in the methods of FIGS. 2-4 described above. In an aspect, then, such code and/or instructions can be used to configure and/or adapt a general-purpose computer (or other device) to perform one or more operations in accordance with the described methods.

In some embodiments, memory 960 may include registration module 975. Registration module 975 may include code that, when executed by the processor(s) 910, cause the processor(s) 910 to perform any suitable operation for obtaining, soliciting, storing, receiving, transmitting, comparing, or otherwise interaction with any suitable vehicle metadata and/or occupant metadata. The registration module 975 may provide any suitable graphical and/or audible interface with which any suitable combination of vehicle metadata and/or occupant metadata maybe obtained (e.g., from a user of the proxy device 900). The registration module 975 may include one or more application programming interface with which occupant metadata may be obtained and/or provided by one or more user devices associated with one or more occupants of the vehicle.

Processor(s) 910 may receive location, vehicle metadata and/or occupant metadata of vehicle A 580, status, GNSS and other sensor measurements, and capability information from vehicle A 580 and/or vehicle B 590 such as GNSS measurements, sensor measurements, velocity, heading, location, stopping distance, priority or emergency status and other vehicle-related information. In an embodiment, environmental information such as road surface information/status, weather status, and camera information may be gathered and shared with vehicles, either via point to point or broadcast messaging (e.g., from RSU(s) 525, vehicle A 580, vehicle B 590, or any suitable combination of the servers of FIG. 5). Processor(s) 910 may utilize the received information to coordinate and direct traffic flow and to provide environmental, vehicular, safety and announcement messages to vehicle A 580, which would otherwise not be able to ascertain such information. By utilizing the proxy device 900, a legacy vehicle can participate in a V2X environment such that information provided by other V2X entities can be presented to the driver of the legacy vehicle.

Processor 525A may be configured to operate a network interface 525B, in an embodiment, which may be connected via a backhaul to network 570, and which may be used, in an embodiment, to communicate and coordinate with various centralized servers such as a centralized traffic control and optimization server 565 that monitors and optimizes the flow of traffic in an area such as within a city or a section of a city or in a region. Network interface 525B may also be utilized for remote access to RSU(s) 525 for crowd sourcing of vehicle data, maintenance of the RSU(s) 525, and/or coordination with other RSU(s) 525 or other uses. RSU(s) 525 may have a processor 525A configured to operate traffic control unit 525C which may be configured to process data received from vehicles such as vehicle A 580 and vehicle B 590 such as location data, stopping distance data, road condition data, identification data and other information related to the status and location of nearby vehicles and environment. RSU(s) 525 may have a processor 525A configured to obtain data from environmental and roadside sensors 525D, which may include temperature, weather, camera, pressure sensors, road sensors (for car detection, for example), accident detection, movement detection, speed detection and other vehicle and environmental monitoring sensors.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory (e.g., memory 960 of FIG. 9) can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method for utilizing vehicle metadata by a mobile device to perform operations on behalf of a vehicle, comprising:
   obtaining, by the mobile device, vehicle metadata associated with the vehicle, the vehicle metadata describing one or more attributes of the vehicle;
   receiving, via one or more transceivers of the mobile device, a data message from a remote device, wherein the remote device comprises:
      a vehicle-to-everything (V2X) vehicle,
      a second mobile device transmitting on behalf of a vehicle, or
      a roadside unit;
   determining, by the mobile device, whether to process the data message based at least in part on the vehicle metadata; and either:
      performing, by the mobile device, one or more operations based on the data message and in response to a determination to process the data message, or
      ignoring the data message, by the mobile device, in response to a determination not to process the data message.

2. The method of claim 1, wherein executing one or more operations comprises:
   generating driving assistance information based at least in part on the received data message,
   providing the driving assistance information to an output device associated with the mobile device or the vehicle,
   determining a data element of the data message comprises additional vehicle metadata corresponding to the vehicle,
   transmitting at least a portion of the additional vehicle metadata in one or more data messages,
   or any combination thereof.

3. The method of claim 1, wherein the driving assistance information is generated based at least in part on occupant metadata associated with one or more occupants of the vehicle.

4. The method of claim 1, wherein obtaining the vehicle metadata is in response to determining, by the mobile device, that a vehicle is being utilized, or is likely to be utilized, for transportation.

5. The method of claim 1, further comprising obtaining, by the mobile device, occupant metadata associated with an occupant of the vehicle, wherein processing the data message is further based at least in part on the occupant metadata.

6. The method of claim 5, wherein the occupant metadata comprises:
   an identifier for the occupant,
   driving credential information associated with the occupant,
   one or more physical attributes of the occupant,
   driving experience data associated with the occupant,
   user preference information associated with the occupant,
   one or more occupant attributes,
   or any combination thereof.

7. The method of claim 1, wherein the vehicle metadata comprises:
   an image of the vehicle, the image being captured by a camera of the mobile device or a third party device,
   one or more identifiers associated with the vehicle,
   one or more capabilities of the vehicle,
   one or more physical attributes of the vehicle,
   or any combination thereof.

8. The method of claim 1, wherein the vehicle metadata comprises an image of the vehicle and a portion of the vehicle metadata is obtained based at least in part on comparing the image of the vehicle to predefined vehicle data.

9. The method of claim 1, further comprising:
   identifying, by the mobile device, one or more vehicle attributes from the data message; and comparing, by the mobile device, the one or more vehicle attributes received in the data message to the vehicle metadata stored at the mobile device, wherein the data message is processed based at least in part on the comparison.

10. A mobile device comprising:
a memory; and
one or more processors communicatively coupled with the memory, the one or more processors being configured to:
obtain vehicle metadata associated with the vehicle, the vehicle metadata describing one or more attributes of the vehicle;
receive, via one or more transceivers, a data message from a remote device, wherein the remote device comprises:
a vehicle-to-everything (V2X) vehicle,
a second mobile device transmitting on behalf of a vehicle, or
a roadside unit;
determine whether to process the data message based at least in part on the vehicle metadata; and either:
perform one or more operations based on the data message and in response to a determination to process the data message, or
ignore the data message in response to a determination not to process the data message.

11. The mobile device of claim 10, wherein performing the one or more operations causes the one or more processors to:
generate driving assistance information based at least in part on the received data message,
provide the driving assistance information to an output device associated with the mobile device or the vehicle,
determine a data element of the data message comprises additional vehicle metadata corresponding to the vehicle,
transmit at least a portion of the additional vehicle metadata in one or more data messages,
or any combination thereof.

12. The mobile device of claim 10, wherein the driving assistance information is generated based at least in part on occupant metadata associated with one or more occupants of the vehicle.

13. The mobile device of claim 10, wherein the vehicle metadata is obtained in response to determining that a vehicle is being utilized, or is likely to be utilized, for transportation.

14. The mobile device of claim 10, wherein the one or more processors are further configured to obtain occupant metadata associated with an occupant of the vehicle, wherein processing the data message is further based at least in part on the occupant metadata.

15. The mobile device of claim 14, wherein the occupant metadata comprises:
an identifier for the occupant,
driving credential information associated with the occupant,
one or more physical attributes of the occupant,
driving experience data associated with the occupant,
user preference information associated with the occupant,
one or more occupant attributes,
or any combination thereof.

16. The mobile device of claim 10, wherein the vehicle metadata comprises:
an image of the vehicle, the image being captured by a camera of the mobile device or a third party device,
one or more identifiers associated with the vehicle,
one or more capabilities of the vehicle,
one or more physical attributes of the vehicle,
or any combination thereof.

17. The mobile device of claim 10, wherein the vehicle metadata comprises an image of the vehicle and a portion of the vehicle metadata is obtained based at least in part on comparing the image of the vehicle to predefined vehicle data.

18. The mobile device of claim 10, wherein the one or more processors are further configured to:
identify one or more vehicle attributes from the data message; and
compare the one or more vehicle attributes received in the data message to the vehicle metadata stored at the mobile device, wherein the data message is processed based at least in part on the comparison.

19. A non-transitory computer-readable medium having instructions stored for utilizing vehicle metadata to perform one or more operations on behalf of a vehicle, wherein the instructions, when executed by one or more processors of a mobile device, cause the one or more processors to:
obtain vehicle metadata associated with the vehicle, the vehicle metadata describing one or more attributes of the vehicle;
receive, via one or more transceivers of the mobile device, a data message from a remote device, wherein the remote device comprises:
a vehicle-to-everything (V2X) vehicle,
a second mobile device transmitting on behalf of a vehicle, or
a roadside unit;
determine whether to process the data message based at least in part on the vehicle metadata; and either:
perform one or more operations based on the data message and in response to a determination to process the data message, or
ignore the data message in response to a determination not to process the data message.

20. The non-transitory computer-readable medium of claim 19, wherein performing the one or more operations causes the one or more processors to:
generate driving assistance information based at least in part on the received data message,
provide the driving assistance information to an output device associated with the mobile device or the vehicle,
determine a data element of the data message comprises additional vehicle metadata corresponding to the vehicle,
transmit at least a portion of the additional vehicle metadata in one or more data messages,
or any combination thereof.

21. The non-transitory computer-readable medium of claim 19, wherein the one or more processors are further configured to obtain occupant metadata associated with an occupant of the vehicle, wherein processing the data message is further based at least in part on the occupant metadata.

22. The non-transitory computer-readable medium of claim 21, wherein the occupant metadata comprises:
an identifier for the occupant,
driving credential information associated with the occupant,
one or more physical attributes of the occupant,
driving experience data associated with the occupant, user preference information associated with the occupant,
one or more occupant attributes,
or any combination thereof.

23. The non-transitory computer-readable medium of claim 19, wherein the vehicle metadata comprises:
an image of the vehicle, the image being captured by a camera of the mobile device, or a third party device,
one or more identifiers associated with the vehicle,
one or more capabilities of the vehicle,
one or more physical attributes of the vehicle,
or any combination thereof.

24. A mobile device comprising:
means for obtaining vehicle metadata associated with the vehicle, the vehicle metadata describing one or more attributes of the vehicle;
means for receiving a data message from a remote device, wherein the remote device comprises:
a vehicle-to-everything (V2X) vehicle,
a second mobile device transmitting on behalf of a vehicle, or
a roadside unit;
means for determining whether to process the data message based at least in part on the vehicle metadata; and
means for either:
performing one or more operations based on the data message and in response to a determination to process the data message, or
ignoring the data message in response to a determination not to process the data message.

25. The mobile device of claim 24, wherein the means for performing the one or more operations comprises:
means for generating driving assistance information based at least in part on the received data message,
means for providing the driving assistance information to an output device associated with the mobile device or the vehicle,
means for determining a data element of the data message comprises additional vehicle metadata corresponding to the vehicle,
means for storing, at the mobile device, the additional vehicle metadata received from the data message,
means for transmitting at least a portion of the additional vehicle metadata in one or more data messages,
or any combination thereof.

26. The mobile device of claim 24, wherein obtaining the vehicle metadata is in response to determining, by the mobile device, that a vehicle is being utilized, or is likely to be utilized, for transportation, and wherein the vehicle metadata comprises:
an image of the vehicle, the image being captured by a camera of the mobile device, or a third party device,
one or more identifiers associated with the vehicle,
one or more capabilities of the vehicle,
one or more physical attributes of the vehicle,
or any combination thereof.

27. The mobile device of claim 24, wherein the mobile device further comprises a means for obtaining occupant metadata associated with an occupant of the vehicle, wherein processing the data message is further based at least in part on the occupant metadata.

28. The mobile device of claim 27, wherein the occupant metadata comprises:
an identifier for the occupant,
driving credential information associated with the occupant,
one or more physical attributes of the occupant,
driving experience data associated with the occupant,
user preference information associated with the occupant,
one or more occupant attributes,
or any combination thereof.

29. The mobile device of claim 24, wherein the vehicle metadata comprises an image of the vehicle and a portion of the vehicle metadata is obtained based at least in part on comparing the image of the vehicle to predefined vehicle data.

30. The mobile device of claim 24, wherein the mobile device further comprises:
means for identifying one or more vehicle attributes from the data message; and
means for comparing the one or more vehicle attributes received in the data message to the vehicle metadata stored at the mobile device, wherein the data message is processed based at least in part on the comparison.

* * * * *